United States Patent
Shimohara

(10) Patent No.: US 9,267,056 B2
(45) Date of Patent: Feb. 23, 2016

(54) INK COMPOSITION, IMAGE FORMING METHOD, PRINTED MATERIAL, AND GRAFT COPOLYMER

(71) Applicant: FUJIFILM CORPORATION, Tokyo (JP)

(72) Inventor: Norihide Shimohara, Ashigarakami-gun (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/593,118

(22) Filed: Jan. 9, 2015

(65) Prior Publication Data

US 2015/0118451 A1 Apr. 30, 2015

Related U.S. Application Data

(63) Continuation of application No. PCT/JP2013/069602, filed on Jul. 19, 2013.

(30) Foreign Application Priority Data

Aug. 23, 2012 (JP) ................................. 2012-184479

(51) Int. Cl.
| | |
|---|---|
| C09D 11/10 | (2014.01) |
| C09D 151/08 | (2006.01) |
| B05D 1/26 | (2006.01) |
| C09D 151/00 | (2006.01) |
| C08F 299/00 | (2006.01) |
| C09D 11/106 | (2014.01) |
| C09D 11/30 | (2014.01) |
| C08F 265/06 | (2006.01) |

(52) U.S. Cl.
CPC .......... *C09D 151/003* (2013.01); *C08F 265/06* (2013.01); *C08F 299/00* (2013.01); *C09D 11/106* (2013.01); *C09D 11/30* (2013.01)

(58) Field of Classification Search
CPC .................................................. C09D 151/003
See application file for complete search history.

(56) References Cited

U.S. PATENT DOCUMENTS

| | | | | |
|---|---|---|---|---|
| 5,852,123 A | * | 12/1998 | Huybrechts | ........... C08F 257/02 525/279 |
| 2009/0286001 A1 | | 11/2009 | Kanke et al. | |

FOREIGN PATENT DOCUMENTS

| | | |
|---|---|---|
| JP | 2000-160086 A | 6/2000 |
| JP | 2005-307199 A | 11/2005 |
| JP | 2007-119449 A | 5/2007 |

OTHER PUBLICATIONS

International Search Report; PCT/JP2013/069602; Oct. 22, 2013.

* cited by examiner

*Primary Examiner* — Vu A Nguyen
(74) *Attorney, Agent, or Firm* — Studebaker & Brackett PC

(57) ABSTRACT

An ink composition includes a graft copolymer including a repeating unit having a partial structure represented by Formula (1) described below and a repeating unit having a hydrophilic group in which a graft chain includes the repeating unit and water.

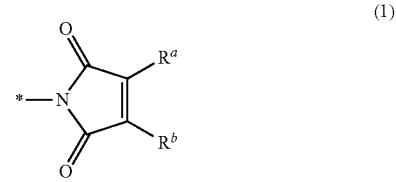

(1)

16 Claims, No Drawings

INK COMPOSITION, IMAGE FORMING METHOD, PRINTED MATERIAL, AND GRAFT COPOLYMER

CROSS-REFERENCE TO RELATED APPLICATIONS

This application is a Continuation of PCT International Application No. PCT/JP2013/069602 filed on Jul. 19, 2013, which claims priority under 35 U.S.C §119(a) to Japanese Patent Application No. 2012-184479 filed on Aug. 23, 2012. Each of the above applications is hereby expressly incorporated by reference, in its entirety, into the present application.

BACKGROUND OF THE INVENTION

1. Field of the Invention

The present invention relates to an ink composition that can be applied to the usage in ink jet recording, an image-forming method and a printed material for which the ink composition is used, and a new graft copolymer.

2. Description of the Related Art

As an image-recording method in which an image is formed on a recording medium such as paper on the basis of an image data signal, there are an electrophotographic method, a sublimation-type or melting-type thermal transfer method, an ink jet method, and the like.

In the electrophotographic method, there are problems in that a process for forming an electrostatic latent image on a photoreceptor drum through charging and exposure is required, the system becomes complicated, and consequently, the manufacturing cost becomes expensive. In addition, in the thermal transfer method, while the apparatus is not expensive, an ink ribbon is used, and thus there are problems of the expensive operation cost, the generation of waste materials, and the like.

On the other hand, in the ink jet method, since ink is discharged only to required image sections using an inexpensive apparatus, and an image is directly formed on a recording medium, ink can be efficiently used, there is an advantage of an inexpensive operation cost, furthermore, only a small amount of noise is generated, and the method is an excellent image-recording method.

Among ink compositions used to record images using the ink jet method, an active energy ray-curable aqueous ink composition has a number of excellent characteristics such that the ink composition can be preferably used for the printing of images, a pretreatment for imparting printing aptitude to recording media, a post treatment to protect and decorate printed images, and the like, the stability is excellent since the ink composition includes water as a major component, the ink composition can be applied to high-density ink jet recording by a decrease in the viscosity, and the like.

In recent years, ink images formed on a resin recording medium using an ink composition have been often provided for the usages of large-area advertisements, outdoor advertisements, and the like. Particularly, in the case of outdoor advertisements, strong water resistance is required. In addition, in a case in which a large-area printed material or a number of printed materials are continuously formed, a step for removing dirt in a printing apparatus using an organic solvent becomes necessary; however, in a case in which the organic solvent used for cleaning is scattered, and is attached to a formed ink image, when the image has poor solvent resistance, sections to which the solvent is attached are dissolved and removed, and image defects such as voids may be generated, and therefore there is a demand for an ink composition capable of forming an image having excellent water resistance and solvent resistance.

Examples of a basic constituent material of the active energy ray-curable aqueous ink composition include water, polymerizing substances, polymerization initiators initiating polymerization by generating a radical or the like by an active energy ray, and color materials (pigments and dyes). Among them, polymerizing substances and polymerization initiators can be prepared in an emulsion state, or can be present in a solution state by being imparted with water solubility by an appropriate substituent.

Examples of the active energy ray-curable aqueous ink composition in which the polymerizing substance and the polymerization initiator are water-soluble include the ink composition described in, for example, JP2005-307199A, and according to the ink composition, an ink composition for ink jet recording with which a film having excellent adhesiveness and the like can be obtained by light irradiation can be obtained.

In addition, JP2007-119449A and JP2000-160086A describe ink compositions including an active energy ray polymerizing substance having a specific maleimide structure.

SUMMARY OF THE INVENTION

However, regarding the technique described in JP2005-307199A in which a water-soluble polymerization initiator is used, the decomposed substance or unreacted residue of the added polymerization initiator remains in a cured film, and thus the film properties or printed materials are adversely affected, and therefore there is room for further improving the water resistance of printed images.

In addition, in JP2007-119449A, there is no study regarding the solvent resistance of a formed image, and there is also room for improving the water resistance. In JP2000-160086A, the subject invention is a solvent-based ink composition, and there is no study regarding the application to aqueous ink and the water resistance of a formed image.

Generally, it is possible to improve any of the solvent resistance or the water resistance of a formed image by selecting a polymer compound or a solvent included in an ink composition; however, currently, it is difficult to satisfy both properties at a high level and improve the adhesiveness of a formed image to a printing medium.

In addition, when an image is formed using the ink jet method, the discharge properties of the ink composition when the ink composition is discharged through ink jet are important. Regarding the discharge properties, not only a discharge property of continuously striking droplets but also a discharge property of suppressing the occurrence of latency in a case in which droplets are struck at intervals are important. The latency refers to poor discharging in which, in a case in which approximately five seconds to five minutes are taken from an ink strike to the following ink strike, the ink struck in the latter ink strike lands on a position coming later than the planned position on a recording medium, or the amount of the struck ink is decreased.

The latency is considered to occur due to the generation of a dried substance at nozzle tips which is generated by the drying of some of the ink composition which remains at the nozzle tips from the former ink strike, the clogging of a part of nozzles due to an increase in the concentration of the ink composition, or an abnormal ink strike in the latter strike due to a change in the viscosity of the ink composition.

As the ink composition, there is a desire for an ink composition which suppresses the occurrence of the latency, and lands on accurate landing positions.

The present invention has been made in consideration of the above-described circumstances, and an object of the present invention is to provide an ink composition which suppresses the occurrence of the latency, causes an obtained image to exhibit strong water resistance and solvent resistance, and is preferable for the formation of an image using the ink jet method.

In addition, an object of the present invention is to provide an image-recording method in which an image that is excellent in terms of the discharge properties when the ink composition is discharged using the ink jet method, and is excellent in terms of both water resistance and solvent resistance can be formed, and a printed material having images that are excellent in terms of both water resistance and solvent resistance.

Furthermore, an object of the present invention is to provide a new graft copolymer preferable for the ink composition and the like.

The ink composition, image-forming method, printed material, and graft copolymer of the present invention for solving the problems are as described below.

<1> An ink composition including (a) a graft copolymer including a repeating unit (a-1) having a partial structure represented by Formula (1) described below and a repeating unit (a-2) having a hydrophilic group in which a graft chain includes the repeating unit (a-1); and (b) water.

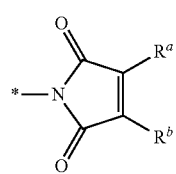

(1)

In Formula (1), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. '*' represents a bonding site.

<2> The ink composition according to <1> in which the repeating unit (a-1) having the partial structure represented by Formula (1) is a repeating unit represented by Formula (2) described below.

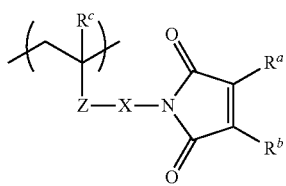

(2)

In Formula (2), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. $R^c$ represents a hydrogen atom or a methyl group, and Z represents a single bond, —COO—, or —CONR$^d$—. $R^d$ represents a hydrogen atom or an alkyl group having 1 to 4 carbon atoms, and '**' represents a bonding site with X. X represents a divalent organic group.

<3> The ink composition according to <1> or <2> in which a main chain of (a) the graft copolymer includes a repeating unit represented by Formula (3) described below.

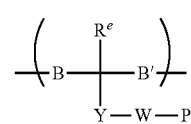

(3)

In Formula (3), Y represents a single bond, a phenylene group, —COO—, or —CONR$^d$—, $R^d$ represents a hydrogen atom or an alkyl group having 1 to 4 carbon atoms, and '**' represents a bonding site with W. W represents a divalent organic group. P represents a polymer chain including a repeating unit represented by Formula (2) described below. Each of B and B' independently represents a single bond, an alkylene group having 1 to 9 carbon atoms, or an arylene group having 6 to 12 carbon atoms. In addition, in a case in which B and B' are an alkylene group, one carbon atom forming the alkylene group may be substituted by —O—, —OC(=O)—, —C(=O)O—, —OC(C=O)NR$^f$—, or —NR$^g$C(=O)NR$^h$—. $R^e$ represents a hydrogen atom or an alkyl group having 1 to 4 carbon atoms. Each of $R^f$, $R^g$, and $R^h$ independently represents a hydrogen atom or a linear alkyl group having 1 to 4 carbon atoms.

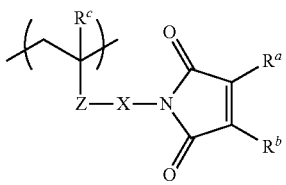

(2)

In Formula (2), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. $R^c$ represents a hydrogen atom or a methyl group, and Z represents a single bond, —COO—, or —CONR$^d$—. $R^d$ represents a hydrogen atom or an alkyl group having 1 to 4 carbon atoms, and '**' represents a bonding site with X. X represents a divalent organic group.

<4> The ink composition according to any one of <1> to <3> in which the repeating unit (a-2) having a hydrophilic group is a repeating unit having at least one hydrophilic group selected from the group consisting of an alcoholic hydroxyl group, an alkyl-substituted carbamoyl group, a carboxyl group, a sulfo group, and salts thereof.

<5> The ink composition according to any one of <1> to <4> in which the repeating unit (a-2) having a hydrophilic group is a repeating unit having at least one hydrophilic group selected from a carboxyl group and salts thereof.

<6> The ink composition according to any one of <1> to <5> in which (a) the graft copolymer is a copolymer of a macromonomer including the repeating unit (a-1) having a partial structure represented by Formula (1).

<7> The ink composition according to any one of <1> to <6> in which a content of the repeating unit (a-1) having a partial structure represented by Formula (1) is in a range of 20 mass % to 70 mass % of a total mass of (a) the graft copolymer, and a content of the repeating unit (a-2) having a hydrophilic group is in a range of 8 mass % to 25 mass % of the total mass of (a) the graft copolymer.

<8> The ink composition according to any one of <1> to <7> in which (a) the graft copolymer further includes a repeating unit (a-3) having a hydrophobic group.

<9> The ink composition according to <8> in which the repeating unit (a-3) having a hydrophobic group is a repeating unit derived from alkyl(meth)acrylate having 4 to 22 carbon atoms.

<10> The ink composition according to any one of <1> to <9> further includes (d) a colorant.

<11> The ink composition according to any one of <1> to <10> which is used for ink jet recording.

<12> The ink composition according to any one of <1> to <11> which is used for printing on a non-permeable recording medium.

<13> An image-forming method includes applying the ink composition according to any one of <1> to <12> onto a recording medium; and radiating an active energy ray onto the ink composition applied to the recording medium.

<14> The image-forming method according to <13> further includes drying at least some of (b) the water included in the ink composition applied to the recording medium to remove.

<15> A printed material includes an image formed by the ink composition according to any one of <1> to <12> on a recording medium.

<16> A printed material includes an image formed by the image-forming method according to <13> or <14> on a recording medium.

<17> A graft copolymer includes a repeating unit (a-1) having a partial structure represented by Formula (1) described below and a repeating unit (a-2) having a hydrophilic group, in which a graft chain includes the repeating unit (a-1);

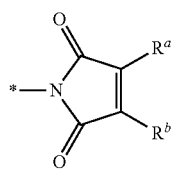

(1)

In Formula (1), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. '*' represents a bonding site.

According to the present invention, it is possible to provide an ink composition which suppresses the occurrence of the latency, causes an obtained image to exhibit strong water resistance and solvent resistance, and is preferable for the formation of an image using the ink jet method.

In addition, according to the present invention, it is possible to provide an image-recording method in which an image that is excellent in terms of the discharge properties when the ink composition is discharged using the ink jet method, and is excellent in terms of both water resistance and solvent resistance can be formed, and a printed material having images that are excellent in terms of both water resistance and solvent resistance.

Furthermore, according to the present invention, it is possible to provide a new graft copolymer preferable for the ink composition and the like.

DESCRIPTION OF THE PREFERRED EMBODIMENTS

Hereinafter, the ink composition, image-forming method, printed material, and graft copolymer of the present invention will be described.

In the present invention, a graft chain refers to a branch polymer chain bonded to a polymer main chain forming the backbone of (a) a graft copolymer, and will be referred to simply as "a side chain of the graft copolymer" in some cases.

In the present specification, when the amounts of individual components of the composition are mentioned, in a case in which the composition includes a plurality of substances corresponding to the individual components, unless particularly otherwise described, the amounts indicate the total amount of a plurality of the substances included in the composition.

In addition, the solid content in the ink composition of the present invention indicates the total mass of all components except for a solvent out of components included in the ink composition at 25° C. In the present specification, the solid content also includes liquid-form components such as low-molecular-weight components other than a solvent.

In the present specification, a numeric range expressed using "to" indicates a range including the numeric values before and after the "to" as the lower limit value and the upper limit value.

In the present specification, the term "step" includes not only an independent step but also a step which cannot be clearly differentiated from other steps, but achieves the purpose of the step.

[Ink Composition]

The ink composition of the present invention is an ink composition including (a) a graft copolymer including a repeating unit (a-1) having a partial structure represented by Formula (1) described below and a repeating unit (a-2) having a hydrophilic group in which a graft chain includes the repeating unit (a-1), and (b) water.

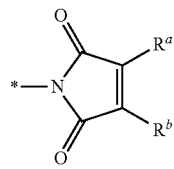

(1)

In Formula (1), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. '*' represents a bonding site.

Meanwhile, in the present specification, (a) the graft copolymer according to the present invention including the repeating unit (a-1) having the partial structure represented by Formula (1) and the repeating unit (a-2) having a hydrophilic group will be referred to as "(a) the specific copolymer" in some cases.

When including the respective components described above, the ink composition of the present invention is capable of forming a favorable image that is excellent in terms of the discharge properties when the ink composition is discharged using the ink jet method, and has strong water resistance and strong solvent resistance.

Here, in the present invention, the water resistance and solvent resistance of an image refer to the durability of a formed image against water and a solvent.

The mechanism of the present invention is not clear, but the present inventors assume as described below.

The graft copolymer (specific copolymer) in the present invention includes the repeating unit (a-1) having the partial structure represented by Formula (1) in a graft chain, and the partial structure represented by Formula (1) is polymerized by the radiation of a radioactive ray such as an ultraviolet ray. It is considered that, when the partial structure represented by Formula (1) is included in a section of the graft chain which is a side chain, the mobility of the partial structure represented by Formula (1) is improved, the polymerizing properties by the radiation of an ultraviolet ray or the like are favorable, and crosslinking is generated. An image obtained using the ink composition including the specific copolymer in the present invention is highly curable, and a cured image is excellent in terms of water resistance (hydrolysis resistance) and solvent resistance.

In addition, since the specific copolymer is a graft copolymer, compared with a linear copolymer having substantially the same molecular weight, it is considered that the ink composition including the specific copolymer has a low viscosity, and furthermore, the concentration dependency of the viscosity is low. When an image is drawn using the ink jet method, there is a case in which the ink strike from discharge nozzles is paused for a short period of time. However, when the ink composition of the present invention is used, the discharge properties stay favorable in the restart of discharging even in a case in which the ink composition remaining at the tip section of the nozzles is dried while the ink strike is on hold for a short period of time, and the concentration of the ink composition is increased. This is assumed to be an effect of the facts that the ink composition of the present invention has a low viscosity, and the concentration dependency of the viscosity is low.

In addition, since the specific copolymer includes a polymerizing maleimide group at the graft chain which is a side chain, a cured image includes a polymer having a crosslinking structure at the side chain, and it is considered that the appropriate setting of the type and amount of the maleimide group in the specific copolymer, the conditions of curing, and the like provide an obtained image with excellent flexibility, and prevents the peeling and the like of the image even when a recording medium is bent, and therefore the adhesiveness to the recording medium is also improved.

The ink composition of the present invention includes (a) the specific copolymer and (b) water, and, if necessary, may further include (c) a solvent (dispersion medium) including a water-soluble organic solvent, a fluid, or a variety of solid compounds as additives as long as the effects of the present invention are not impaired. Examples of the additives include (d) the colorant, and, when (d) the colorant is included, it is possible to obtain a colored image from the ink composition of the present invention. In addition, as described below, the ink composition may include other components for a variety of purposes.

Hereinafter, the ink composition of the present invention (hereinafter, also referred to simply as "the ink composition") will be described in detail.

[(a) Specific Copolymer]

(a) The graft copolymer included in the ink composition of the present invention is a graft copolymer including a repeating unit (a-1) having a partial structure represented by Formula (1) described below and a repeating unit (a-2) having a hydrophilic group, in which a graft chain includes the repeating unit (a-1);

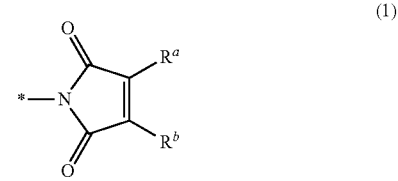

(1)

In Formula (1), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. '*' represents a bonding site.

In Formula (1), the alkyl group having 1 to 4 carbon atoms represented by $R^a$ or $R^b$ may have a linear structure or a branched structure. Specific examples of the alkyl group include a methyl group, an ethyl group, a propyl group, an isopropyl group, a butyl group, an isobutyl group, a sec-butyl group, and a t-butyl group. Among the above-described alkyl groups, the alkyl group is preferably an alkyl group having 1 or 2 carbon atoms (a methyl group or an ethyl group), and is particularly preferably an alkyl group having one carbon atom (a methyl group).

In Formula (1), the alkyl group represented by $R^a$ or $R^b$ may or may not have a substituent, but preferably has no substituent.

$R^a$ and $R^b$ may be bonded each other to form a 4- to 6-membered alicyclic structure.

Regarding $R^a$ and $R^b$, it is preferable that both be alkyl groups having 1 to 4 carbon atoms, or $R^a$ and $R^b$ be bonded each other to form a 4- to 6-membered alicyclic structure, both $R^a$ and $R^b$ are more preferably alkyl groups having 1 or 2 carbon atoms, and both $R^a$ and $R^b$ are still more preferably alkyl groups having one carbon atom.

Hereinafter, specific examples of the partial structure represented by Formula (1) will be described, but the present invention is not limited thereto.

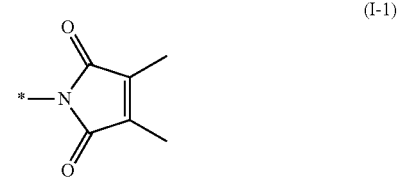

(I-1)

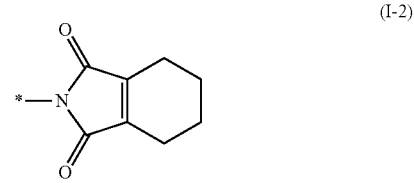

(I-2)

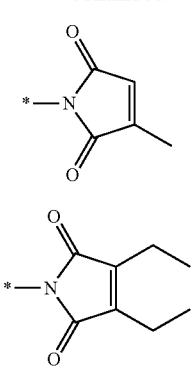

(I-3)

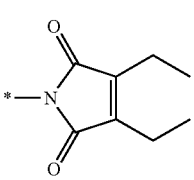

(I-4)

(a) The specific copolymer has the partial structure represented by Formula (1) in the graft chain, and furthermore, may has the partial structure represented by Formula (1) in a side chain of the major chain of the specific copolymer in addition to the graft chain.

The repeating unit (a-1) having the partial structure represented by Formula (1) is preferably a repeating unit represented by Formula (2) described below.

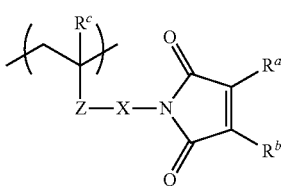

(2)

In Formula (2), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure. $R^c$ represents a hydrogen atom or a methyl group, and Z represents a single bond, —COO—, or —CONR$^d$—. $R^d$ represents a hydrogen atom or an alkyl group having 1 to 4 carbon atoms, and '**' represents a bonding site with X. X represents a divalent organic group.

In Formula (2), each of $R^a$ and $R^b$ independently represents a hydrogen atom or an alkyl group having 1 to 4 carbon atoms, and at least one of $R^a$ and $R^b$ represents an alkyl group having 1 to 4 carbon atoms. $R^a$ and $R^b$ may be bonded each other to form a 4- to 6-membered alicyclic structure.

In Formula (2), $R^a$ and $R^b$ are identical to $R^a$ and $R^b$ in Formula (1), and the preferable ranges thereof are also identical.

In Formula (2), $R^c$ represents a hydrogen atom or a methyl group. $R^c$ is preferably a methyl group.

In Formula (2), Z represents a single bond, —COO—, or —CONR$^d$—, $R^d$ represents a hydrogen atom or an alkyl group having 1 to 4 carbon atoms. '' represents a bonding site with X. Z is preferably —COO—.

In addition, $R^d$ in the —CONR$^d$—** represents a hydrogen atom or an alkyl group having 1 to 4 carbon atoms. The alkyl group having 1 to 4 carbon atoms represented by $R^d$ may have a linear structure or a branched structure. Specific examples of the alkyl group include a methyl group, an ethyl group, a propyl group, an isopropyl group, a butyl group, an isobutyl group, a sec-butyl group, and a t-butyl group. $R^d$ is preferably a hydrogen atom or an alkyl group having 1 or 2 carbon atoms, that is, a methyl group or an ethyl group, and is particularly preferably a hydrogen atom. In a case in which $R^d$ represents an alkyl group, the alkyl group may or may not have a substituent, but preferably has no substituent.

In Formula (2), X represents a divalent organic group. Examples of the divalent organic group include an alkylene group and an aralkylene group, and the divalent organic group is preferably an alkylene group having 2 to 20 carbon atoms or an aralkylene group having 6 to 12 carbon atoms. X is more preferably an alkylene group.

In a case in which X represents the alkylene group, the alkylene group preferably has 2 to 20 carbon atoms, more preferably has 2 to 12 carbon atoms, and still more preferably has 2 to 8 carbon atoms. When the number of carbon atoms in the alkylene group represented by X is within the above-described range, the mobility of the partial structure represented by Formula (1) in (a) the specific copolymer is improved, and the effects of the present invention are further improved.

The alkylene group represented by X may have a linear structure, a structure in which a branch is included in an alkylene chain, or a cyclic structure. In addition, the alkylene group may include a bond selected from —O—, —COO—, —OC(=O)—, and —CONH— in the alkylene chain. In addition, the alkylene group may be substituted by an alkyl group having 4 or less carbon atoms, a hydroxyl group, or a chlorine atom.

A preferable repeating unit represented by Formula (2) includes $R^a$ and $R^b$ being respectively and independently an alkyl group having 1 or 2 carbon atoms, $R^c$ being a methyl group, Z being —COO—**, and X being an alkylene group having 2 to 12 carbon atoms.

The content of the repeating unit (a-1) having the partial structure represented by Formula (1) (preferably having the repeating unit represented by Formula (2)) in (a) the specific copolymer is appropriately selected depending on properties that a cured film (image) formed of the ink composition is intended to have. That is, the content of the repeating unit (a-1) having the partial structure represented by Formula (1) is preferably in a range of 20 mass % to 70 mass %, more preferably in a range of 30 mass % to 70 mass %, and still more preferably in a range of 40 mass % to 60 mass % of the full mass of (a) the specific copolymer from the viewpoint of the strength and flexibility of a formed image.

When the content is within the above-described range, the strength of an obtained image is improved. In a case in which an ink image having excellent flexibility is formed, the content is preferably low in the above-described range.

(a) The specific copolymer may only include one type of the repeating unit (a-1) having the partial structure represented by Formula (1), or may include two or more thereof.

The repeating unit (a-1) having the partial structure represented by Formula (1) can be introduced into (a) the specific copolymer by copolymerizing a monomer having the partial structure represented by Formula (1) as a copolymerization component. In a case in which the repeating unit (a-1) having the partial structure represented by Formula (1) is the repeating unit represented by Formula (2), a monomer represented by Formula (2') described below can be used for the synthesis of (a) the specific copolymer.

In addition, the partial structure represented by Formula (1) can also be introduced using a method in which a polymer reaction is used. Examples of the method include a method in which a corresponding anhydride is reacted with a prepolymer including a primary amino group, a method in which a compound including a functional group which reacts with a functional group in a prepolymer, and forms a bond and a repeating unit having the partial structure represented by Formula (1) is reacted with the prepolymer, and the like.

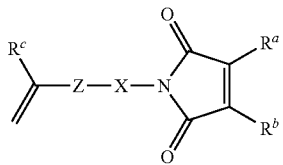
(2')

In Formula (2'), $R^a$, $R^b$, $R^c$, Z, and X are respectively identical to $R^a$, $R^b$, $R^c$, Z, and X in Formula (2), and the preferable ranges thereof are also identical.

Preferable examples of the monomer represented by Formula (2') include monomers (2'-1) to (2'-11) illustrated below, but the present invention is not limited thereto.

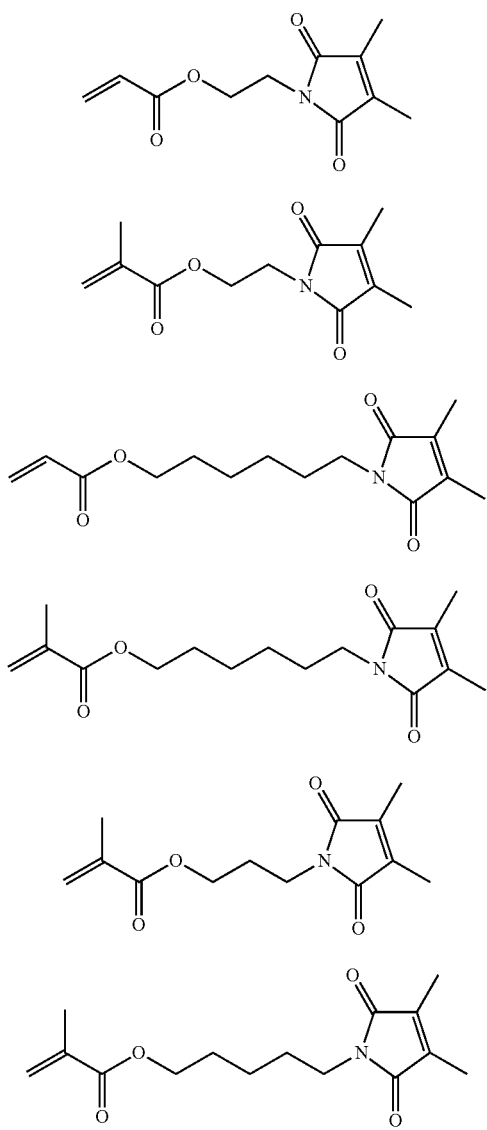

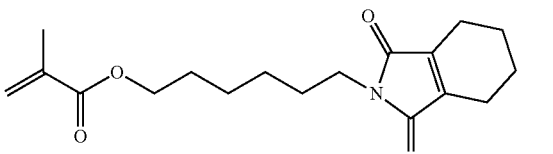
(2'-7)

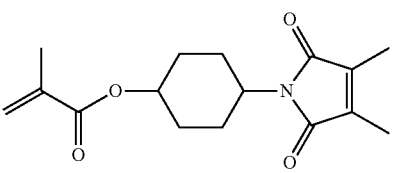
(2'-8)

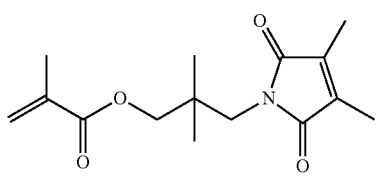
(2'-9)

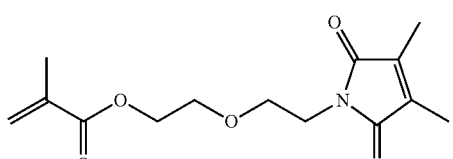
(2'-10)

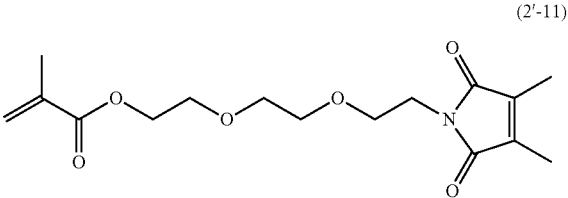
(2'-11)

Monomers having the partial structure represented by Formula (1), which are represented by monomers (2'-1) to (2'-11) can be produced with reference to the method described in, for example, JP1977-988A (JP-S52-988A), JP1992-251258A (JP-H4-251258A), and the like.

The main chain in (a) the specific copolymer in the present invention preferably includes a repeating unit represented by Formula (3) described below.

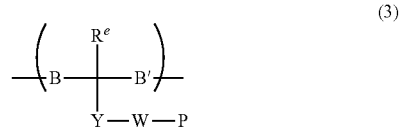
(3)

In Formula (3), Y represents a single bond, a phenylene group, —COO—, or —CONR$^d$—, $R^d$ represents a hydrogen atom or an alkyl group having 1 to 4 carbon atoms, and '**' represents a bonding site with W. W represents a divalent organic group. P represents a polymer chain including a repeating unit represented by Formula (2). Each of B and B' independently represents a single bond, an alkylene group having 1 to 9 carbon atoms, or an arylene group having 6 to 12 carbon atoms. In addition, in a case in which B and B' are an alkylene group, one carbon atom forming the alkylene group may be substituted by —O—, —OC(=O)—, —C(=O)O—, —OC(C=O)NR$^f$—, or —NR$^g$C(=O)NR$^h$—. R$^e$ represents a hydrogen atom or an alkyl group having 1 to 4 carbon atoms. Each of R$^f$, R$^g$, and R$^h$ independently represents a hydrogen atom or a linear alkyl group having 1 to 4 carbon atoms.

The repeating unit represented by Formula (3) is preferably a repeating unit represented by Formula (4) described below in terms of the ease of synthesis.

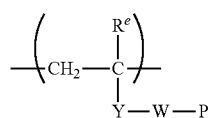
(4)

In Formula (4), Y represents a single bond, a phenylene group, —COO—, or —CONR$^d$—, R$^d$ represents a hydrogen atom or an alkyl group having 1 to 4 carbon atoms, and '**' represents a bonding site with W. W represents a divalent organic group. P represents a polymer chain including a repeating unit represented by Formula (2). R$^e$ represents a hydrogen atom or an alkyl group having 1 to 4 carbon atoms.

A so-called macromonomer supplying the repeating unit represented by Formula (4) is preferably a structure represented by Formula (5) described below.

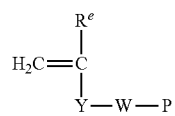
(5)

In Formula (5), Y represents a single bond, a phenylene group, —COO—, or —CONR$^d$—, R$^d$ represents a hydrogen atom or an alkyl group having 1 to 4 carbon atoms, and '**' represents a bonding site with W. W represents a divalent organic group. P represents a polymer chain including a repeating unit represented by Formula (2). R$^e$ represents a hydrogen atom or an alkyl group having 1 to 4 carbon atoms.

(a) The specific copolymer in the present invention is preferably a copolymer of a macromonomer including the repeating unit (a-1) having the partial structure represented by Formula (1). The macromonomer is preferably a structure represented by Formula (5).

The macromonomers can be synthesized by polymerizing a polymerizing compound including the monomer represented by Formula (2') in the presence of an initiator having a reactive group or a chain transfer agent, and furthermore, causing a reaction with a polymerizing compound having a group that reacts with a reactive group introduced into a terminal.

Specific examples include a method in which a polymerizing compound including the monomer represented by Formula (2') is polymerized in the presence of a polymerization initiator having a hydroxyl group or a chain transfer agent having a hydroxyl group, a hydroxyl group is introduced into a terminal of the polymer, and then is reacted with a polymerizing compound having a group (for example, an isocyanate group, a glycidyl group, a chloromethyl group, or the like) that reacts with a hydroxyl group or a corresponding alkoxide, a method in which a carboxyl group introduced into a polymer terminal in the same manner, a glycidyl group, and a chloromethyl group are reacted together, and the like. The macromonomer can be synthesized in the same manner by combining well-known reactions such as a method in which a reaction with an amino group introduced to a polymer terminal, a glycidyl group, a chloromethyl group, an isocyanate group, or a formyl group is caused.

The weight-average molecular weight of the macromonomer of Formula (5) is preferably in a range of 500 to 20000, more preferably in a range of 1000 to 10000, and most preferably in a range of 1000 to 7000.

The divalent organic group represented by W in Formulae (3), (4), and (5) is a linear or branched alkylene group having 1 to 12 carbon atoms, and may include —O—, —S—, —OC(=O)—, —C(=O)O—, —OC(C=O)NR$^f$—, or —NR$^g$C(=O)NR$^h$— in the alkylene group. Each of R$^f$, R$^g$, and R$^h$ independently represents a hydrogen atom or a linear alkyl group having 1 to 4 carbon atoms. The alkylene group may be substituted by an alkyl group having 1 to 4 carbon atoms, a hydroxyl group, a halogen atom, or a cyano group.

The divalent organic group represented by W is preferably a structure described below.

Among divalent organic groups illustrated below, '*' represents a bonding site with Y, and '**' represents a bonding site with P.

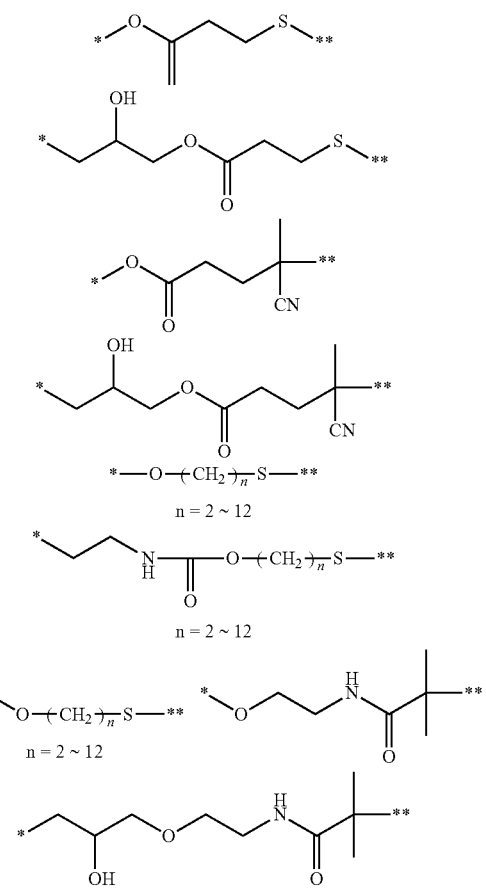

(Repeating Unit (a-2) Having a Hydrophilic Group)

(a) The specific copolymer in the present invention includes a specific amount of the repeating unit (a-2) having a hydrophilic group.

The hydrophilic group is not particularly limited as long as groups have a function of enhancing the hydrophilicity of (a) the specific copolymer, and may be a nonionic hydrophilic group or an ionic hydrophilic group (for example, an anionic hydrophilic group or a cationic hydrophilic group).

The nonionic hydrophilic group is not particularly limited, and examples thereof include non-ionic hydrophilic groups such as residues obtained by removing one hydrogen atom from a heterocyclic structure including a nitrogen atom or a sulfur atom, an amide group, a carbamoyl group, an alkyl-substituted carbamoyl group, an alcoholic hydroxyl group, and groups having a polyalkyleneoxy structure.

Examples of the heterocyclic structure in the residues obtained by removing one hydrogen atom from a heterocyclic structure including a nitrogen atom or a sulfur atom include lactones such as γ-butyrolactone; cyclic ureas such as 2-pyrrolidone and ethylene urea; cyclic carbonates such as ethylene carbonate and propylene carbonate; cyclic ethers such as tetrahydrofuran and 1,4-dioxane; and the like.

The amide group is preferably an amide group having 2 to 10 carbon atoms, and, in the amide group, a hydrogen atom is preferably bonded to a nitrogen atom.

Examples of the alkyl-substituted carbamoyl group include monoalkyl carbamoyl groups in which a hydrogen atom bonded to a nitrogen atom included in the carbamoyl group is substituted by an alkyl group and dialkyl carbamoyl groups in which two hydrogen atoms bonded to a nitrogen atom included in the carbamoyl group are substituted by alkyl groups. The alkyl group may further include a substituent such as a hydroxyl group. Among the above-described alkyl-substituted carbamoyl groups, monoalkyl carbamoyl groups substituted by an alkyl group having 1 to 8 carbon atoms or an alkyl group having 1 to 4 carbon atoms which is substituted by a hydroxyl group are preferred.

The groups having a polyalkyleneoxy structure are not particularly limited, but a polyalkyleneoxy structure having an alkyleneoxy group having 1 to 4 carbon atoms as a repeating unit is preferred. The polyalkyleneoxy structure may include only one type of alkyleneoxy group, or may include a combination of multiple types of alkyleneoxy groups. The terminal group of the polyalkyleneoxy structure is preferably a hydroxyl group or an alkoxy group, and more preferably a hydroxyl group or a methoxy group.

The ionic hydrophilic group is not particularly limited, and examples thereof include a carboxyl group, a sulfo group, a phosphate group, a phosphonate group, a phenolic hydroxyl group, a quaternary ammonium group, and the like. The ionic hydrophilic group may form a salt.

In a case in which the ionic hydrophilic group forms a salt, examples of a counter salt include onium salts such as alkali metal salts (Li, Na, K, and the like), ammonium salts, pyridinium salts, and phosphonium salts. Among them, alkali metal salts (Li, Na, K, and the like) or ammonium salts are preferred.

Among the above-described hydrophilic groups, an amide group, a carbamoyl group, an alkyl-substituted carbamoyl group, an alcoholic hydroxyl group, groups having a polyalkyleneoxy structure, a carboxyl group, a sulfo group, and salts thereof are preferred, and an alcoholic hydroxyl group, an alkyl-substituted carbamoyl group, a carboxyl group, a sulfo group, and salts thereof are more preferred. In addition, a carboxyl group and salts thereof are particularly preferred.

The repeating unit (a-2) having the hydrophilic group is preferably a repeating unit represented by Formula (8) described below.

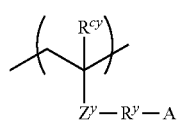
(8)

Formula (8) will be described in detail.

In Formula (8), $R^{cy}$ represents a hydrogen atom or a methyl group.

In Formula (8), $Z^y$ represents —COO—*, —CONR$^{dy}$—*, or a single bond, and is preferably —COOO—*. Meanwhile, "*" represents a location at which $Z^y$ is bonded to $R^y$.

$R^{dy}$ represents a hydrogen atom or an alkyl group having 1 to 4 carbon atoms. The alkyl group having 1 to 4 carbon atoms may have a linear structure or a branched structure. Specific examples of the alkyl group include a methyl group, an ethyl group, a propyl group, an isopropyl group, a butyl group, an isobutyl group, a sec-butyl group, and a t-butyl group. $R^{dy}$ is preferably a hydrogen atom or an alkyl group having 1 or 2 carbon atoms (that is, a methyl group or an ethyl group), and is particularly preferably a hydrogen atom.

$R^{dy}$ may or may not have a substituent, but preferably has no substituent. Examples of a substituent that $R^{dy}$ may have include aryl groups having 6 to 8 carbon atoms, alkoxy groups having 1 to 8 carbon atoms, a hydroxyl group, a carboxyl group, halogen atoms (F, Cl, Br, I, and the like), and the like.

In Formula (8), $R^y$ represents a group selected from the group consisting of a single bond, an alkylene group, an arylene group, and an aralkylene group, and is preferably an alkylene group having 1 to 20 carbon atoms, an arylene group having 6 to 20 carbon atoms, or an aralkylene group having 7 to 20 carbon atoms.

In a case in which $R^y$ is a group selected from the group consisting of an alkylene group, an arylene group, and an aralkylene group, these groups may or may not have a substituent. In addition, the alkylene group, the arylene group, and the aralkylene group represented by $R^y$ may have an ether bond, an ester bond, an amide bond, or a urethane bond in the structure thereof.

In Formula (3), $R^y$ is preferably a single bond.

In a case in which $R^y$ is a group selected from the group consisting of an alkylene group, an arylene group, and an aralkylene group, these groups may further have a substituent. Examples of the substituent include aryl groups having 6 to 8 carbon atoms, alkoxy groups having 1 to 8 carbon atoms, a hydroxyl group, a carboxyl group, halogen atoms (F, Cl, Br, I, and the like), and the like.

In a case in which $R^y$ is an alkylene group having 1 to 20 carbon atoms, the alkylene group may have a linear structure, a branched structure, or a cyclic structure. The number of carbon atoms in a case in which $R^y$ is an alkylene group is more preferably in a range of 2 to 12, and still more preferably in a range of 2 to 8. Specific examples of the alkylene group of $R^y$ include —$CH_2$—, —$C_2H_4$—, —$C(CH_3)_2$—$CH_2$—, —$CH_2C(CH_3)_2CH_2$—, —$C_6H_{12}$—, —$C_4H_7(C_4H_9)C_4H_8$—, —$C_{18}H_{36}$—, 1,4-trans-cyclohexylene group, —$C_2H_4$—OCO—$C_2H_4$—, —$C_2H_4$—OCO—, —$C_2H_4$—O—$C_5H_{10}$—, —$CH_2$—O—$C_5H_9(C_5H_{11})$—, —$C_2H_4$—CONH—$C_2H_4$—, —$C_4H_8$—OCONH—$C_6H_{12}$—, —$CH_2$—OCONHC$_{10}H_{20}$—, —$CH_2CH(OH)CH_2$—, and the like.

In a case in which $R^y$ is an arylene group having 6 to 20 carbon atoms, the number of carbon atoms in the arylene group is preferably in a range of 6 to 18, more preferably in a range of 6 to 14, and particularly preferably in a range of 6 to 10. Specific examples of the arylene group represented by $R^y$ include a phenylene group, a biphenylene group, —$C_6H_4$—CO—$C_6H_4$—, a naphthylene group, and the like.

In a case in which $R^y$ is an aralkylene group having 7 to 20 carbon atoms, the number of carbon atoms in the aralkylene group is preferably in a range of 7 to 18, more preferably in a range of 7 to 14, and particularly preferably in a range of 7 to 10. Specific examples of the aralkylene group represented by $R^y$ include —$C_3H_6$—$C_6H_4$—, —$C_2H_4$—$C_6H_4$—$C_6H_4$—, —$CH_2$—$C_6H_4$—$C_6H_4$—$C_2H_4$—, —$C_2H_4$—OCO—$C_6H_4$—, and the like.

A in Formula (8) represents a hydrophilic group, and examples of the hydrophilic group include the hydrophilic groups previously described, and the preferable range thereof is also identical.

The repeating unit represented by Formula (8) is derived from a monomer represented by Formula (8') described below, and, when the monomer is included as a copolymerization component, the repeating unit (a-2) is introduced into (a) the specific copolymer.

In Formula (8'), $R^{cy}$, $Z^y$, $R^y$, and A are respectively identical to $R^{cy}$, $Z^y$, $R^y$, and A in Formula (8), and the preferable ranges thereof are also identical.

Preferable examples of the monomer represented by Formula (8') include monomer compounds described below, but the present invention is not limited thereto.

The preferable examples include methoxy polyethylene glycol(meth)acrylate, polyethylene glycol(meth)acrylate, polypropylene glycol(meth)acrylate, poly(ethylene glycol-co-propylene glycol)(meth)acrylate, 2-hydroxyethyl(meth)acrylate, glycerol(meth)acrylate(meth)acryloyloxy ethyl ethylene urea, vinyl pyrrolidone, 3-(meth)acryloyloxy-γ-butyrolactone, acrylamide, tert-butylacrylamide, N,N-dimethyl(meth)acrylamide, diacetone acrylamide, sodium (meth)acrylate, potassium(meth)acrylate, tetrabutyl ammonium(meth)acrylate, mono(meth)acryloyloxyethyl succinate, mono(meth)acryloyloxyethyl sodium phthalate, (meth)acryloyloxyethyl acid phosphate, sodium 2-acrylamide-2-methylpropane sulfonic acid, 2-acrylamide-2-methylpropane sulfonic acid, stylenesulfonate, sodium styrenesulfonate, vinyl benzoic acid, and the like.

As the monomer represented by Formula (8'), commercially available compounds can be used, and also can be produced using a well-known conventional method that is generally known.

In addition, in the present invention, in addition to the monomer represented by Formula (8'), it is possible to preferably use unsaturated dicarboxylic acids such as maleic acid, maleic acid anhydride, and fumaric acid, anhydrides thereof, and furthermore, dicarboxylic acid salts derived from the above-described acids and anhydrides.

Regarding the content of the repeating unit having the hydrophilic group in (a) the specific copolymer, the preferable content varies depending on the type of the hydrophilic group, but is preferably set to a content at which (a) the specific copolymer becomes water-soluble.

Here, the content at which (a) the specific copolymer becomes water-soluble refers to a content at which 3 mass % or more of (a) the specific copolymer can be dissolved in water at 25° C.

The content of the repeating unit (a-2) in (a) the specific copolymer is preferably in a range of 8 mass % to 25 mass %, more preferably in a range of 10 mass % to 23 mass %, and still more preferably in a range of 10 mass % to 20 mass %.

When the content of the repeating unit (a-2) is within the above-described range, the polarity of (a) the specific copolymer according to the present invention is appropriately maintained, and appropriate water resistance is obtained.

In a case in which (a) the specific copolymer includes the repeating unit represented by Formula (8), the content of the repeating unit represented by Formula (8) in (a) the specific copolymer is as described below.

In a case in which the hydrophilic group A in Formula (8) is an ionic hydrophilic group, the content of the repeating unit represented by Formula (8) is preferably in a range of 5 mass % to 50 mass %, more preferably in a range of 5 mass % to 40 mass %, and particularly preferably in a range of 8 mass % to 25 mass % in the repeating unit (a-2) having the hydrophilic group.

In a case in which the hydrophilic group A in Formula (8) is a non-ionic hydrophilic group, the content of the repeating unit represented by Formula (8) is preferably in a range of 20 mass % to 95 mass %, more preferably in a range of 30 mass % to 80 mass %, and particularly preferably in a range of 30 mass % to 70 mass % in the repeating unit (a-2) having the hydrophilic group.

(a) The specific copolymer may include only one type of the repeating unit (a-2) having a hydrophilic group, or may include two or more types thereof.

(Repeating Unit (a-3) Having a Hydrophobic Group)

(a) The specific copolymer preferably further includes a repeating unit (a-3) having a hydrophobic group. When the repeating unit having a hydrophobic group is included, the polarity of (a) the specific copolymer is appropriately maintained, and an ink image formed using the ink composition has superior water resistance, and also has excellent adhesiveness to a non-absorbable recording medium.

As the repeating unit (a-3) having a hydrophobic group, any repeating unit can be used without any limitation as long as the repeating unit is a repeating unit derived from a vinyl monomer in which the solubility (25° C.) in water of a homopolymer which is constituted only of (a-3), and has a weight-average molecular weight of 10,000 or more is less than 1.0 mass %, and, among them, a repeating unit derived from a monomer selected from alkyl esters and aralkyl esters of (meth)acrylate is preferably used.

From the viewpoint of adjusting the polarity of (a) the specific copolymer to be within an appropriate range, the hydrophobic group is preferably a monomer having an alkyl group having 4 to 22 carbon atoms, more preferably a monomer having an alkyl group having 8 to 22 carbon atoms, and still more preferably a monomer having an alkyl group having 8 to 14 carbon atoms. That is, in the case of an alkyl acrylate, the hydrophobic group is an ester having an alkyl group having 4 to 19 carbon atoms, and is preferably an ester having an alkyl group having 4 to 13 carbon atoms. In the case of an alkyl methacrylate, the hydrophobic group is an ester having an alkyl group having 4 to 18 carbon atoms, and is preferably an ester having an alkyl group having 4 to 10 carbon atoms.

The alkyl group may have a linear shape, a branched chain, or a cyclic shape. In addition, the alkyl group may be an aralkyl ester such as a benzyl group or a phenoxy ethyl group.

The repletion unit (a-3) that can be included in (a) the specific copolymer according to the present invention will be exemplified below, but the (a-3) in the present invention is not limited thereto. Specific examples of the (a-3) include (meth)acrylic acid esters such as methyl(meth)acrylate, ethyl(meth)acrylate, n-propyl(meth)acrylate, isopropyl(meth)acrylate, n-butyl(meth)acrylate, isobutyl(meth)acrylate, tert-butyl (meth)acrylate, n-hexyl(meth)acrylate, 2-ethylhexyl(meth)acrylate, octyl(meth)acrylate, decyl(meth)acrylate, dodecyl (meth)acrylate, stearyl(meth)acrylate, cyclohexyl methacrylate, benzyl methacrylate, phenoxyethyl(meth)acrylate, isoboronyl methacrylate, tetrahydrofurfuryl(meth) acrylate, and acetoacethoxyethyl(meth)acrylate, styrenes such as styrene, α-methyl styrene, and 4-methyl styrene, vinyl ethers such as chloroethyl vinyl ether, and the like.

Among them, n-propyl methacrylate, isopropyl methacrylate, n-butyl(meth)acrylate, isobutyl(meth)acrylate, tert-butyl(meth)acrylate, n-hexyl(meth)acrylate, 2-ethylhexyl(meth)acrylate, octyl(meth)acrylate, decyl(meth)acrylate, dodecyl(meth)acrylate, stearyl(meth)acrylate, cyclohexyl methacrylate, benzyl methacrylate, phenoxyethyl(meth)acrylate, isoboronyl methacrylate, and the like, which are (meth)acrylic acid esters substituted by an alkyl group having 4 to 22 carbon atoms, are preferred, and n-propyl methacrylate, isopropyl methacrylate, n-butyl(meth)acrylate, isobutyl(meth)acrylate, tert-butyl(meth)acrylate, n-hexyl(meth)acrylate, 2-ethylhexyl(meth)acrylate, octyl(meth)acrylate, benzyl methacrylate, phenoxyethyl(meth)acrylate, and the like are more preferred. In addition, n-butyl methacrylate, isobutyl methacrylate, tert-butyl(meth)acrylate, cyclohexyl methacrylate, isoboronyl methacrylate, 2-ethylhexyl methacrylate, and phenoxyethyl(meth)acrylate are particularly preferred.

(a) The specific copolymer may only include one type of the repeating unit (a-3) having a hydrophobic group, or may include two or more types thereof.

From the viewpoint of decreasing the polarity of the specific copolymer, the repeating unit (a-3) having a hydrophobic group is preferably in a range of 5 mass % to 72 mass %, more preferably in a range of 20 mass % to 65 mass %, and most preferably in a range of 25 mass % to 60 mass % in (a) the specific copolymer.

(a) The graft copolymer in the present invention is preferably a polymer compound represented by Formula (6) as described below.

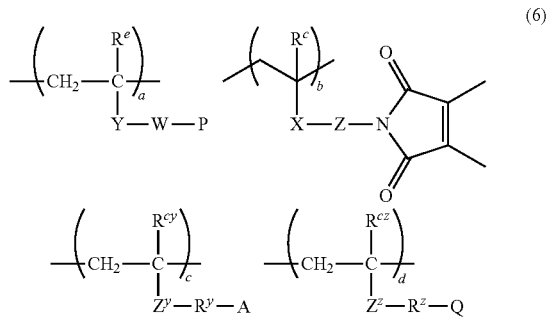

(6)

In Formula (6), Y, W, P, and $R^e$ are respectively identical to Y, W, P, and $R^e$ in Formula (3), and the preferable ranges thereof are also identical.

X, Z, and $R^c$ are respectively identical to X, Z, and $R^c$ in Formula (2), and the preferable ranges thereof are also identical.

$R^{cy}$, $Z^y$, $R^y$, and A are respectively identical to $R^{cy}$, $Z^y$, $R^y$, and A in Formula (8), and the preferable ranges thereof are also identical.

$R^{cz}$, $Z^z$, and $R^z$ are respectively identical to $R^{cz}$, $Z^y$, and $R^y$ in Formula (6), and the preferable ranges thereof are also identical. Q is a monovalent organic group, and represents an alkyl group having 1 to 12 carbon atoms or an aryl group having 6 to 12 carbon atoms.

The alkyl group or aryl group represented by Q in Formula (6) may be substituted by an alkyl group having 1 to 4 carbon atoms, a halogen atom, an alkoxy group having 1 to 4 carbon atoms, or a heterocyclic group. Preferable examples of the heterocycle include a tetrahydrofurfuryl cycle, a 2,2,6,6-tetramethyl pyperazine cycle, 1,2,2,6,6-pentamethyl pyperazine cycle, and the like.

P in Formula (3) will be further described.

P in Formula (3) represents a polymer chain including the repeating unit represented by Formula (2), and P is preferably a homopolymer chain or copolymer chain of a monomer supplying Formula (2). Examples of a repeating unit other than the repeating unit represented by Formula (2) constituting the copolymer chain include repeating units having a hydrophilic group, repeating units having a hydrophobic group, and the like which can be used in the present invention.

P is preferably a polymer chain represented by Formula (7) described below.

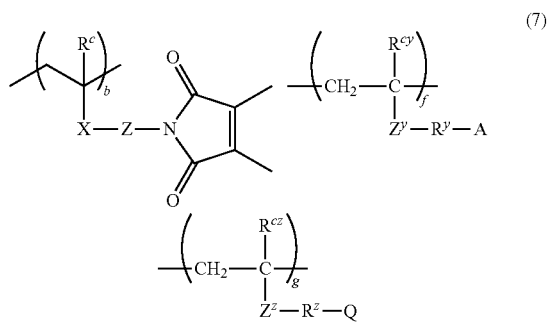

(7)

In Formula (7), X, Z, and $R^c$ are respectively identical to X, Z, and $R^c$ in Formula (2), and the preferable ranges thereof are also identical.

$R^{cy}$, $Z^y$, $R^y$, and A are respectively identical to $R^{cy}$, $Z^y$, $R^y$, and A in Formula (8), and the preferable ranges thereof are also identical.

$R^{cz}$, $Z^z$, $R^z$, and Q are respectively identical to $R^{cy}$, $Z^y$, $R^y$, and Q in Formula (6), and the preferable ranges thereof are also identical.

In Formulae (6) and (7), 'a' to 'g' represent the mass-equivalent contents of the respective repeating units using 'mass %'. 'a' represents a positive number, and 'b' to 'd', 'f', and 'g' are numbers in a range of 0 to 50, and 'e' is a number in a range of 10 to 70.

More preferably, 'a' is in a range of 10 to 90, 'b' is in a range of 0 to 20, 'c' is in a range of 5 to 20, 'd' is in a range of 0 to 40, 'e' is in a range of 20 to 70, 'f' is in a range of 0 to 20, and 'g' is in a range of 0 to 40.

In the present invention, the specific copolymer is preferably a specific copolymer which is represented by Formula (6), and in which P in Formula (6) is represented by Formula (7), and, regarding the compositional ratio in this case, 'b'+'e' is preferably in a range of 20 mass % to 70 mass %, more preferably in a range of 30 mass % to 70 mass %, and still more preferably in a range of 40 mass % to 60 mass % with respect to the entire specific copolymer. That is, the content of the repeating unit (a-1) having the partial structure represented by Formula (1) is preferably in a range of 20 mass % to 70 mass %, more preferably in a range of 30 mass % to 70 mass %, and still more preferably in a range of 40 mass % to 60 mass % with respect to the total mass of (a) the graft copolymer.

Either 'c' or 'f' is a positive number, and, in a case in which A is an ionic hydrophilic group, 'c'+'f' is preferably in a range of 5 mass % to 50 mass %, more preferably in a range of mass % to 40 mass %, and still more preferably in a range of 8 mass % to 25 mass % with respect to the entire specific copolymer. In addition, in a case in which A is a non-ionic hydrophilic group, 'c'+'f' is preferably in a range of 20 mass % to 95 mass %, more preferably in a range of 30 mass % to 80 mass %, and still more preferably in a range of 30 mass % to 70 mass % with respect to the entire specific copolymer.

'd' and 'g' are respectively optional components for adjusting the film performance, and, from the viewpoint of enhancing the water resistance, 'd'+'g' is preferably in a range of 5 mass % to 72 mass %, more preferably in a range of 20 mass % to 65 mass %, and most preferably in a range of 25 mass % to 60 mass % with respect to the entire specific copolymer.

The weight-average molecular weight of (a) the specific copolymer included in the ink composition of the present invention is preferably in a range of 5,000 to 150,000 from the viewpoint of the water resistance, and is more preferably in a range of 5,000 to 100,000 from the viewpoint of enhancing the discharge properties.

Meanwhile, the weight-average molecular weight is measured using gel permeation chromatography (GPC). In GPC, for example, a HLC-8020GPC (manufactured by Tosoh Corporation) was used, TSKgel SuperHZM-H, TSKgel SuperHZ4000, and TSKgel SuperHZ200 (manufactured by Tosoh Corporation, 4.6 mm ID×15 cm) were used as columns, tetrahydrofuran (THF) was used as an eluent, and the temperature of a column oven was set to 40° C. For the computation of the molecular weights, standard polystyrene was used.

Hereinafter, synthesis examples of the specific copolymer in the present invention will be described. The specific copolymer in the present invention is not limited to the following synthesis examples.

Synthesis Example

Synthesis of Exemplary Compound (2'-5) which was a Monomer Represented by Formula (2')

75 g of toluene and 42.0 g of dimethyl maleic acid anhydride (manufactured by Sigma-Aldrich Japan K.K.) were introduced into a 500 ml three-neck flask equipped with a Dean-Stark distillation tube, and the mixture was heated up to 50° C. while being stirred using a stirrer (manufactured by Shinto Scientific Co., Ltd.: Three-One Motor). 25.0 g of 3-amino-1-propanol was added dropwise to the heated mixture over 30 minutes, and then was stirred for four hours. After the solution was heated up to 60° C., 0.042 g of p-methoxyphenol (manufactured by Wako Pure Chemical Industries, Ltd.) and 6.2 g of sulfuric acid (manufactured by Wako Pure Chemical Industries, Ltd.) were added to the solution, and furthermore, 43.0 g of methacrylic acid was added dropwise over 30 minutes. After the completion of the dropwise addition, the temperature was increased until the solvent was refluxed, and the components were reacted for three hours. After the reaction solution was neutralized using 29 g of a 50 w/v % sodium hydroxide aqueous solution (manufactured by Wako Pure Chemical Industries, Ltd.), 200 ml of toluene and 100 mL of water were added, and were separated. After an organic layer was washed twice using a saturated saline solution, the solvent was distilled away through pressure reduction in a vacuum by adding 30 mg of p-methoxypehnol to the organic layer, thereby obtaining 64.5 g of Exemplary Compound (2'-5) which was a monomer represented by Formula (2'). The generation of an intended substance was confirmed through $^1$H-NMR.

[Synthesis of Macromonomer 1 Including the Repeating Unit of Formula (2)]

30 g of 2-pyrrolidone (manufactured by Wako Pure Chemical Industries, Ltd.) was added to a 200 mL nitrogen-substituted three-neck flask equipped with the stirrer, and was heated to 80° C. in a nitrogen stream. A liquid mixture of 30 g of 2-pyrrolidone, 30 g of Exemplary Compound (2'-5), 1.4 g of 3-mercapto propionate (manufactured by Tokyo Chemical Industry Co., Ltd.), and 0.10 g of dimethyl 2,2'-azobis isobutyrate (manufactured by Wako Pure Chemical Industries, Ltd.) was added dropwise over two hours. 0.10 g of dimethyl 2,2'-azobis isobutyrate was added immediately after the completion of the dropwise addition, two hours later after the completion of the dropwise addition, and four hours later after the completion of the dropwise addition respectively, and furthermore, the components were reacted for two hours at 90° C. 1.9 g of glycidyl methacrylate (manufactured by Tokyo Chemical Industry Co., Ltd.), 0.2 g of tetrabutyl ammonium bromide (manufactured by Wako Pure Chemical Industries, Ltd.), 0.2 g of p-methoxyphenol, and 3.8 g of 2-pyrrolidone were added to the obtained solution, and were reacted for two hours at 60° C., thereby obtaining a 33.3% 2-pyrrolidone solution of Macromonomer 1. In the GPC measurement, Macromonomer 1 was confirmed to have a weight-average molecular weight of 2,600. In addition, a solution obtained by diluting 1.0 g of the obtained solution of Macromonomer 1 using 2.0 g of acetone was re-deposited and precipitated in 50 g of hexane, and it was confirmed in $^1$H-NMR that a methacryloyl group was introduced.

[Synthesis of Polymer A-1]

18 g of 2-pyrrolidone was added to a 500 mL nitrogen-substituted three-neck flask equipped with the stirrer, and was heated to 80° C. in a nitrogen stream. A liquid mixture of 30 g of 2-pyrrolidone, 72 g of the solution of Macromonomer 1, 6.0 g of methacrylic acid (manufactured by Wako Pure Chemical Industries, Ltd.), 0.14 g of 3-mercapto propionate (manufactured by Tokyo Chemical Industry Co., Ltd.), and 0.12 g of dimethyl 2,2'-azobis isobutyrate (manufactured by Wako Pure Chemical Industries, Ltd.) was added dropwise over two hours. 0.13 g of dimethyl 2,2'-azobis isobutyrate was added immediately after the completion of the dropwise addition, two hours later after the completion of the dropwise addition, and four hours later after the completion of the dropwise addition respectively, and furthermore, the components were reacted for two hours, thereby obtaining a polymer solution. Next, 30 g of the obtained polymer solution, 0.98 g of sodium hydrogen carbonate (manufactured by Wako Pure Chemical Industries, Ltd.), and 15 g of water were added to a 200 mL eggplant shaped flask, and were stirred at 60° C. After the dissolution of the polymer, an aqueous solution of 20% of Polymer A-1 was obtained by adding water. In addition, it was confirmed in a GPC measurement that the polymerized solution had a weight-average molecular weight of 26,000.

[Syntheses of Polymer A-2 to A-10]

Exemplary Compound (2'-6) which was a monomer used in Polymer A-2 was synthesized in the same manner as in the synthesis of Exemplary Compound (2'-5) except for the fact that 5-amino-1-pentanol was used instead of 3-amino-1-propanol in the synthesis of Exemplary Compound (2'-5).

Individual macromonomers in Polymer A-2 to A-6 were synthesized by appropriately selecting the monomer in the synthesis of Macromonomer 1 and the amounts of 3-mercapto propionate and glycidyl methacrylate respectively so as to obtain structures described in Structural Formulae of Polymer A-2 to A-6 of Examples.

A macromonomer used in Polymer A-7 was synthesized in the same manner as in the synthesis of Macromonomer 1 except for the facts that, in the synthesis of Macromonomer 1, 2-mercaptoethanol was used instead of 3-mercapto propionate, 2-isocyanate ethyl methacrylate (manufactured by Tokyo Chemical Industry Co., Ltd.) was used instead of glycidyl methacrylate, 0.02 g of U-600 (bismuth tris(2-ethylhexanoate), manufactured by Nittoh Chemical Co., Ltd.) was used as a reaction catalyst, and methacrylic acid was used in addition to Exemplary Compound (2'-5).

Polymers A-2 to A-6 were obtained in a form of a 20% aqueous solution respectively by appropriately adjusting the amounts of the macromonomer and mercapto propionate in the synthesis of Polymer A-1, polymerizing the macromonomer and mercapto propionate, and adjusting the amount of sodium hydrogen carbonate so as to obtain a predetermined degree of neutralization. In the synthesis of A-2, 3-sulfopropyl methacrylate potassium (manufactured by Tokyo Chemical Industry Co., Ltd.) was used as a raw material, and the polymer was synthesized without any neutralization operation.

Polymer A-7 was synthesized in the same manner as in the synthesis of Polymer A-1 except for the facts that the macromonomer for Polymer A-7 and n-butyl methacrylate (manufactured by Wako Pure Chemical Industries, Ltd.) were used instead of Macromonomer 1, and the amount of a reagent was appropriately adjusted in the synthesis of Polymer A-1.

In addition, Polymer A-8 was synthesized using the same method as for Polymers A-1 to A-6, and Polymers A-9 and A-10 were synthesized using the same method as for Polymer A-7.

Specific copolymers (Exemplary Compounds A-1 to A-10) in the present invention obtained in the above-described manner will be described below. However, the specific copolymer in the present invention is not limited thereto.

In Exemplary Compounds described below, 'a' to 'e' and '1' to 'o' represent the mass-equivalent compositional ratios of the respective repeating units to the entire specific copolymers.

A-1
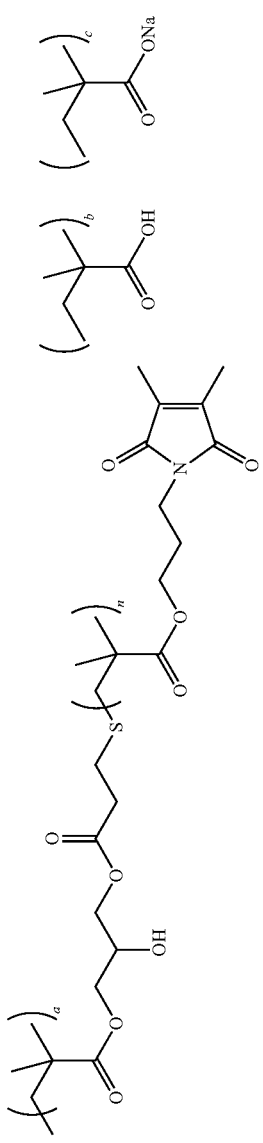
a/b/c = 80/10/10, n = 72, Mw = 26,000
MOLECULAR WEIGHT OF MACROMONOMER OF a COMPONENT: 2,600
A-2
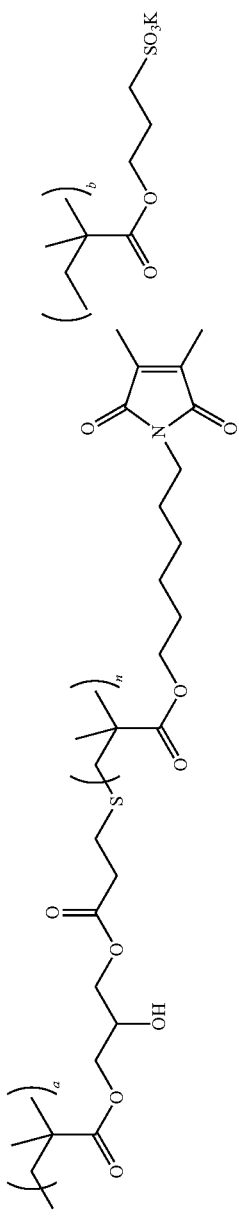
a/b = 85/15, n = 82, Mw = 53,000
MOLECULAR WEIGHT OF MACROMONOMER OF a COMPONENT: 5,600

-continued

A-3 a/b/c/d = 75/5/10/10, n = 68, Mw = 72,000
MOLECULAR WEIGHT OF MACROMONOMER OF a COMPONENT: 2,600

A-4 a/b/c/d = 24/60/8/8, n = 23, Mw = 56,000
MOLECULAR WEIGHT OF MACROMONOMER OF a COMPONENT: 2,600

-continued
A-5
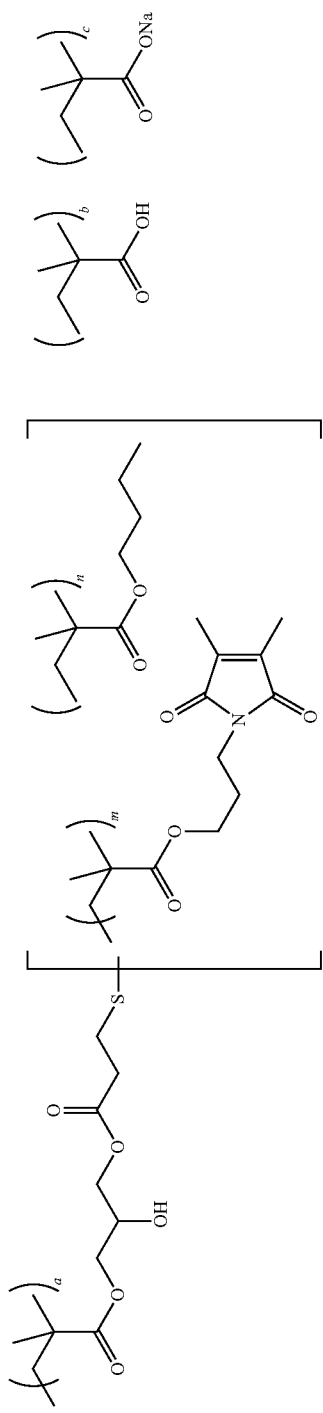
a/b/c = 80/10/10, m/n = 56/17, Mw = 28,000
MOLECULAR WEIGHT OF MACROMONOMER OF a COMPONENT: 3,200
A-6
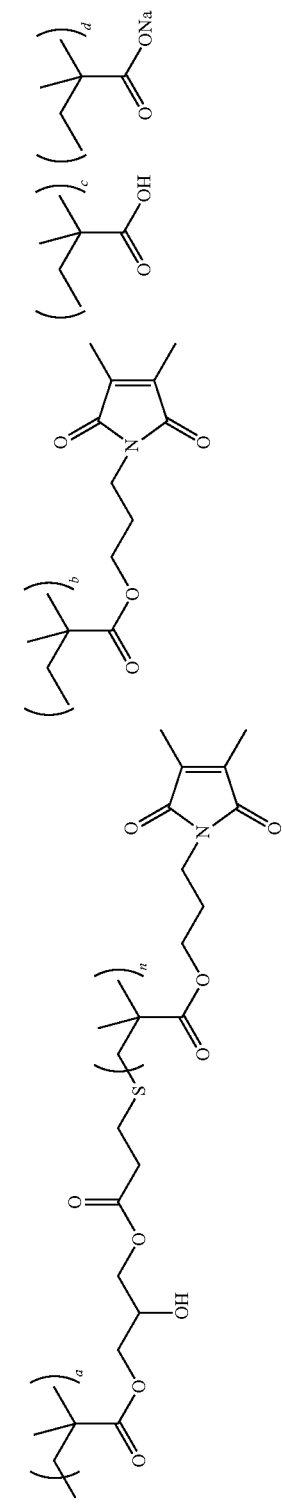
a/b/c/d = 80/5/5/10, n = 72, Mw = 35,000
MOLECULAR WEIGHT OF MACROMONOMER OF a COMPONENT: 2,600

-continued
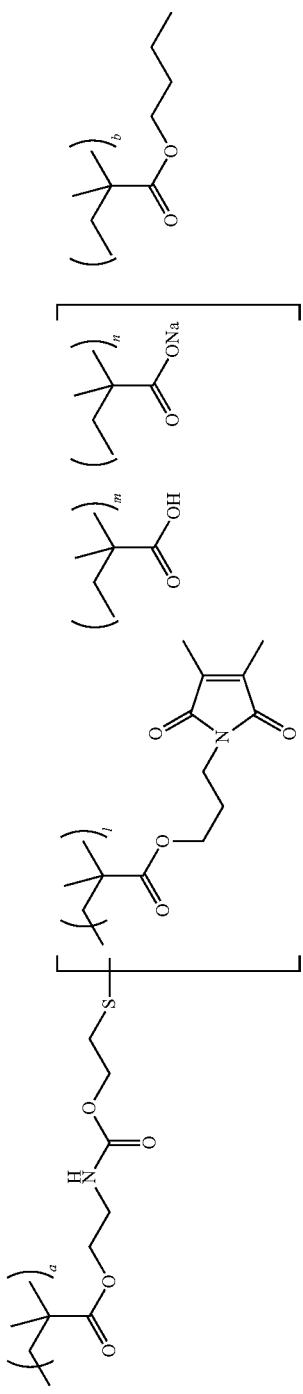
A-7
a/b = 80/20, l/m/n = 60/9/9, Mw = 28,000
MOLECULAR WEIGHT OF MACROMONOMER OF a COMPONENT: 5,400
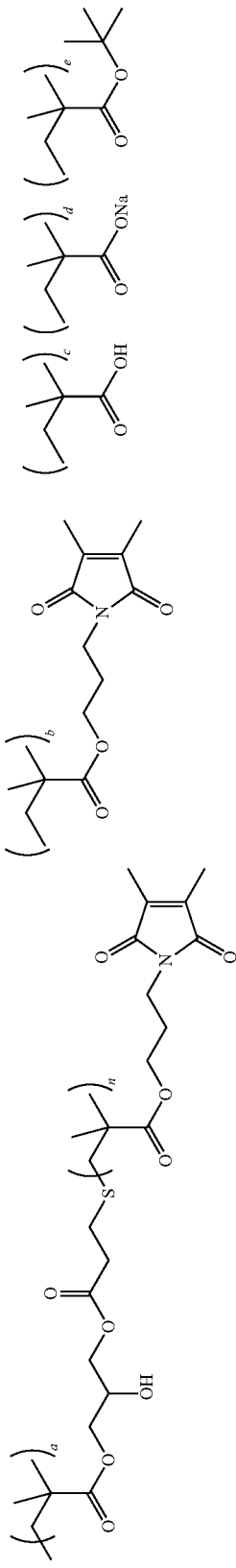
A-8
a/b/c/d/e = 60/10/9/9/12, n = 54, Mw = 52,000
MOLECULAR WEIGHT OF MACROMONOMER OF a COMPONENT: 2,600

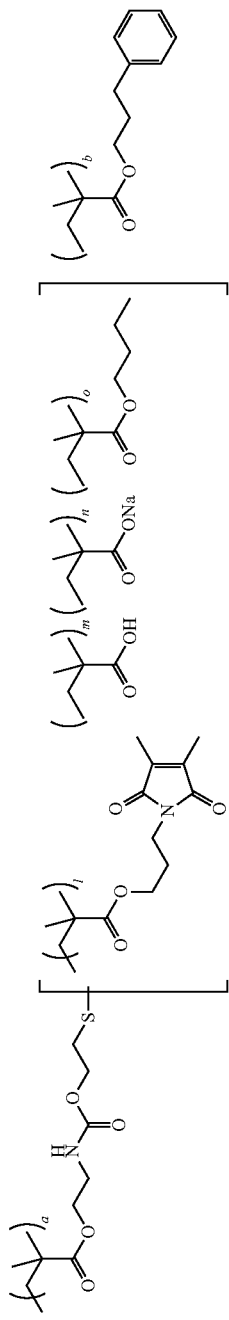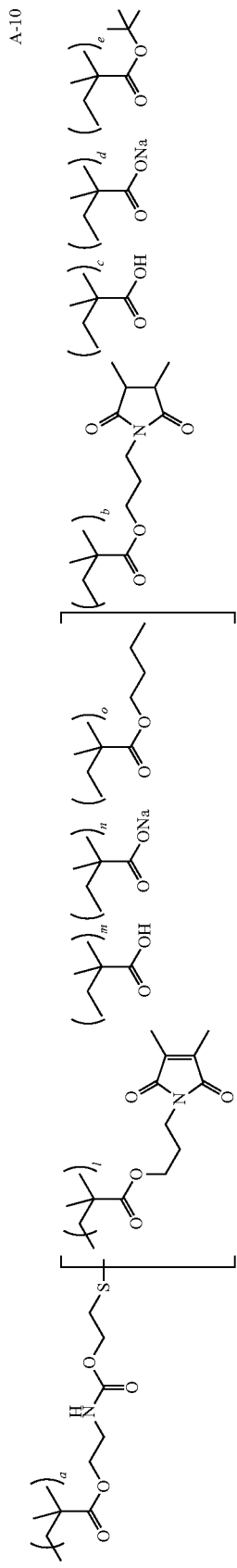

The content of the specific copolymer in the ink composition of the present invention is preferably in a range of 5 mass % to 20 mass %, and more preferably in a range of 5 mass % to 15 mass % with respect to the total mass of the ink composition. When the content is set within the above-described range, the ink composition of the present invention has excellent discharge properties when applied to ink jetting, and an obtained image is excellent in terms of water resistance and solvent resistance.

[(b) Water]

The ink composition of the present invention includes water.

As (b) the water, it is preferable to use impurity-free ion exchange water, distilled water, or the like.

The content of the water in the ink composition of the present invention is preferably in a range of 10 mass % to 97 mass %, more preferably in a range of 30 mass % to 95 mass %, and more preferably in a range of 50 mass % to 85 mass %.

[Other Components]

In the ink composition of the present invention, in addition to (a) the specific copolymer and (b) the water which are the essential components, (c) a water-soluble organic solvent, (d) a colorant, and well-known additives can be jointly used as long as the effects of the present invention are not impaired. Hereinafter, components that can be used in the ink composition will be described.

(c) Water-Soluble Organic Solvent

The ink composition of the present invention includes water as a main solvent, and preferably further includes a water-soluble organic solvent.

Here, the water-soluble organic solvent refers to an organic solvent having a solubility in water at 25° C. of 10 mass % or more.

Examples of the water-soluble organic solvent that can be used in the present invention include the following solvents.

Alcohols (for example, methanol, ethanol, propanol, isopropanol, butanol, isobutanol, secondary butanol, tertiary butanol, pentanol, hexanol, cyclohexanol, benzyl alcohol, and the like), Multivalent alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexane triol, thiodiglycol, 2-methyl-propanediol, and the like)

Multivalent alcohol esters (for example, ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monopenyl ether, propylene glycol monopenyl ether, and the like), Amines (for example, ethanolamine, diethanolamine, triethanolamine, N-methyldiethanolamine, N-ethyl diethanolamine, morpholine, N-ethyl morpholine, ethylenediamine, diethylenediamine, triethylenetetramine, tetraethylenepentamine, polyethyleneimine, pentamethyl diethylenetriamine, tetramethylpropylenediamine, and the like), Amides (for example, formamide, N,N-dimethylformamide, N,N-dimethylacetamide, and the like), methoxy propionamide, N-methylmethoxy propionamide, N,N-dimethylmethoxy propionamide, n-butoxypropionamide, N-methyl n-butoxypropionamide, N,N-dimethyl n-butoxypropionate, and the like)

Heterocycles (for example, 2-pyrrolidone, N-methyl-2-pyrrolidone, cyclohexyl pyrrolidone, 2-oxazolidone, 1,3-dimethyl-2-imidazolidinone, γ-butyrolactone, propylene carbonate, ethylene carbonate, ethylene urea, and the like), Sulfoxides (for example, dimethyl sulfoxide, and the like), Sulfones (for example, sulfolane, and the like)

Others (urea, acetonitrile, acetone, and the like)

Examples of preferable water-soluble organic solvents include multivalent alcohol ethers and heterocycles, and it is also possible to jointly use both.

Among the multivalent alcohol ethers, so-called glycol ethers are preferred, and specifically, tripropylene glycol monomethyl ether, dipropylene glycol monomethyl ether, and dipropylene glycol dimethyl ether are preferred, and 2-dipropylene glycol monomethyl ether is more preferred.

As the heterocycles, 2-pyrrolidone, γ-butyrolactone, propylene carbonate, ethylene urea, and the like are preferred, and 2-pyrrolidone and γ-butyrolactone are particularly preferred.

Particularly, a solvent having a high boiling point can be preferably used, and the boiling point at normal pressure is preferably 120° C. or higher, and more preferably 150° C. or higher.

The water-soluble organic solvent may be singly used, or a plurality of the water-soluble organic solvents may be jointly used. The amount of the water-soluble organic solvent added to the ink composition is preferably in a range of 1 mass % to 60 mass %, and more preferably in a range of 2 mass % to 35 mass % in terms of the total amount.

(d) Colorant

The ink composition of the present invention may also include a colorant, and the inclusion of a colorant produces a colored ink composition.

Examples of the colorant include dyes and pigments, and pigments are preferred from the viewpoint of durability such as heat resistance, light resistance, and water resistance.

In a case in which a pigment is used as the colorant, the pigment can be included in the ink composition in a form of a pigment dispersion. The use of a pigment dispersion as the colorant is preferred from the viewpoint of improving the solvent resistance. In addition to a substance in which a pigment is dispersed using a pigment dispersant, a self-dispersing pigment can also be used as the pigment dispersion.

(Pigment)

As the pigment used as the colorant, in addition to ordinarily used organic pigments and inorganic pigments, substances obtained by dyeing resin particles using a dye can also be used. Generally, any commercially available pigment can be used, and furthermore, it is possible to use pigments that have been previously treated using a commercially available pigment dispersion, surface treatment agent, or the like, for example, a substance obtained by dispersing a pigment in an in-soluble resin or the like as a dispersion medium, a substance obtained by grafting a resin on the pigment surface, or the like as long as the effects of the present invention are not impaired.

Examples of the above-described pigments include the pigments described in "Dictionary of Pigments" by Seishiro Ito (2000), "Industrial Organic Pigments" by W. Herbst, K. Hunger, JP2002-12607A, JP2002-188025A, JP2003-26978A, and JP2003-342503A.

Examples of the organic pigments and inorganic pigments exhibiting yellow color, which can be used in the present invention, include monoazo pigments such as C. I. Pigment Yellow 1 (Fast Yellow G and the like) and C. I. Pigment Yellow 74; disazo pigments such as C. I. Pigment Yellow 12 (Disazo Yellow and the like), C. I. Pigment Yellow 17, C. I. Pigment Yellow 97, C. I. Pigment Yellow 3, C. I. Pigment Yellow 16, C. I. Pigment Yellow 83, C. I. Pigment Yellow 155, and C. I. Pigment Yellow 219; azo lake pigments such as C. I. Pigment Yellow 100 (Tartrazine Yellow Lake and the like); condensed azo pigments such as C. I. Pigment Yellow 95 (Condensed Azo Yellow and the like), C. I. Pigment Yellow 93, C. I. Pigment Yellow 94, C. I. Pigment Yellow 128, and C. I. Pigment Yellow 166; acidic dye lake pigments such as C. I. Pigment Yellow 115 (Quinorine Yellow Lake, and the like); basic dye lake pigment such as C. I. Pigment Yellow 18 (Thioflavin Lake and the like); anthraquinone-based pigments such as C. I. Pigment Yellow 24 (Flavanthrone Yellow); isoindolinone pigments such as isoindolinone yellow 3RLT (Y-110); quinophthalone pigments such as C. I. Pigment Yellow 138 (Quinophthalone Yellow); isoindoline pigments such as C. I. Pigment Yellow 139 (Isoindoline Yellow); nitroso pigments such as C. I. Pigment Yellow 153 (Nickel Nitroso Yellow and the like); metal complex salt azomethine pigments such as C. I. Pigment Yellow 117 (Copper Azomethine Yellow and the like); acetolone pigments such as C. I. Pigment Yellow 120 (Benzimidazolone Yellow), C. I. Pigment Yellow 151, C. I. Pigment Yellow 154, C. I. Pigment Yellow 175, C. I. Pigment Yellow 180, C. I. Pigment Yellow 181, and C. I. Pigment Yellow 194; nickel azo pigments such as C. I. Pigment Yellow 150, and the like. Among them, C. I. Pigment Yellow 74, C. I. Pigment Yellow 120, C. I. Pigment Yellow 150, C. I. Pigment Yellow 151, C. I. Pigment Yellow 154, C. I. Pigment Yellow 155, C. I. Pigment Yellow 180, and the like are preferably used.

Examples of the organic pigments and inorganic pigments exhibiting red or magenta color include monoazo-based pigments such as C. I. Pigment Red 3 (Toluidine Red and the like); B-naphthol pigments such as C. I. Pigment Red 1, C. I. Pigment Red 4, and C. I. Pigment Red 6; disazo pigments such as C. I. Pigment Red 38 (Pyrazolone red B and the like); azo lake pigments such as C. I. Pigment Red 53:1 (Lake Red C and the like); C. I. Pigment Red 57:1 (Brilliant Carmine 6B and the like); C. I. Pigment Red 52:1, and C. I. Pigment Red 48 (B-oxynaphthoic Acid Lake and the like); condensed azo pigments such as C. I. Pigment Red 144 (Condensed Azo Red and the like), C. I. Pigment Red 166, C. I. Pigment Red 220, C. I. Pigment Red 214, C. I. Pigment Red 221, and C. I. Pigment Red 242; acidic dye lake pigments such as C. I. Pigment Red 174 (Phloxine B Lake and the like) and C. I. Pigment Red 172 (Erythrosine Lake and the like); basic dye lake pigments such as C. I. Pigment Red 81 (Rhodamine 6G' Lake and the like); anthraquinone-based pigments such as C. I. Pigment Red 177 (Dianthraminonyl Red and the like); thioindigo pigments such as C. I. Pigment Red 88 (Thioindigo Bordeaux and the like); and perinone pigments such as C. I. Pigment Red 194 (Perinone Red and the like);

perylene pigments such as C. I. Pigment Red 149 (Perylene Scarlet and the like), C. I. Pigment Red 179, C. I. Pigment Red 178, C. I. Pigment Red 190, C. I. Pigment Red 224, C. I. Pigment Red 123, and C. I. Pigment Red 224; quinacridone pigments such as C. I. Pigment Violet 19 (Unsubstituted Quinacridone), C. I. Pigment Red 122 (Quinacridone Magenta and the like), C. I. Pigment Red 262, C. I. Pigment Red 207, and C. I. Pigment Red 209; quinacridone pigment which is a solid content of a plurality of the quinacridone pigments; isoindolinone pigments such as C. I. Pigment Red 180 (Insoindolinone Red 2BLT and the like); alizarin lake pigments such as C. I. Pigment Red 83 (Madder Lake and the like); naphtholone pigments such as C. I. Pigment Red 171, C. I. Pigment Red 175, C. I. Pigment Red 176, C. I. Pigment Red 185, and C. I. Pigment Red 208; naphthol AS lake pigments such as C. I. Pigment Red 247; naphthol AS pigments such as C. I. Pigment Red 2, C. I. Pigment Red 5, C. I. Pigment Red 21, C. I. Pigment Red 170, C. I. Pigment Red 187, C. I. Pigment Red 256, C. I. Pigment Red 268, and C. I. Pigment Red 269; diketopyrrolopyrrole pigments such as C. I. Pigment Red 254, C. I. Pigment Red 255, C. I. Pigment Red 264, and C. I. Pigment Red 27; and the like. Among them, quinacridone pigments such as C. I. Pigment Violet 19 (Unsubstituted Quinacridone), C. I. Pigment Red 122 (Quinacridone Magenta and the like), C. I. Pigment Red 262, C. I. Pigment Red 207, and C. I. Pigment Red 209; quinacridone pigment which is a solid content of a plurality of the quinacridone pigments; and the like are preferred.

Examples of the pigment exhibiting a blue or cyan color include disazo-based pigments such as C. I. Pigment Blue 25 (Dianisidine Blue and the like); phthalocyanine pigments such as C. I. Pigment Blue 15, C. I. Pigment Blue 15:1, C. I. Pigment Blue 15:2, C. I. Pigment Blue 15:3, C. I. Pigment Blue 15:4, C. I. Pigment Blue 15:6 and C. I. Pigment Blue 16 (Phthalocyanine Blue and the like); acidic dye lake pigments such as C. I. Pigment Blue 24 (Peacock Blue Lake and the like); basic dye lake pigments such as C. I. Pigment Blue 1 (Victoria Pure Blue BO Lake and the like); anthraquinone pigments such as C. I. Pigment Blue 60 (Indanthrone Blue and the like), and alkali blue pigments such as C. I. Pigment Blue 18 (Alkali Blue V-5:1). Among them, copper phthalocyanine pigments such as C. I. Pigment Blue 15, C. I. Pigment Blue 15:1, C. I. Pigment Blue 15:2, C. I. Pigment Blue 15:3, C. I. Pigment Blue 15:4, and C. I. Pigment Blue 15:6 are preferred.

Examples of the pigment exhibiting a green color include phthalocyanine pigments such as C. I. Pigment Green 7 (Phthalocyanine Green) and C. I. Pigment Green 36 (Phthalocyanine Green), and azo metal complex pigments such as C. I. Pigment Green 8 (Nitroso Green) and C. I. Pigment Green 10.

Examples of the pigment exhibiting an orange color include isoindoline-based pigments such as C. I. Pigment Orange 66 (Isoindoline Orange); anthraquinone-based pigments such as C. I. Pigment Orange 51 (Dichloropyranthrone Orange); B-naphthol pigments such as C. I. Pigment Orange 2, C. I. Pigment Orange 3, and C. I. Pigment Orange 5; naphthol AS pigments such as C. I. Pigment Orange 4, C. I. Pigment Orange 22, C. I. Pigment Orange 24, C. I. Pigment Orange 38, and C. I. Pigment Orange 74; isoindolinone pigments such as C. I. Pigment Orange 61; perinone pigments such as C. I. Pigment Orange 43; disazo pigments such as C. I. Pigment Orange 15 and C. I. Pigment Orange 16; quinacridone pigments such as C. I. Pigment Orange 48 and C. I. Pigment Orange 49; acetolone pigments such as C. I. Pigment Orange 36, C. I. Pigment Orange 62, C. I. Pigment Orange 60, C. I. Pigment Orange 64, and C. I. Pigment Orange 72; and pyrazolone pigments such as C. I. Pigment Orange 13 and C. I. Pigment Orange 34.

Examples of the pigment exhibiting a brown color include naphtholone pigments such as C. I. Pigment Brown 25 and C. I. Pigment Brown 32.

Examples of the pigment exhibiting a black color include carbon black, titanium black, indazine pigments such as C. I. Pigment Black 1 (Aniline Black), perylene pigments such as C. I. Pigment Black 31 and C. I. Pigment Black 32; and the like. Among them, carbon black is preferred.

Examples of a white pigment that can be used include basic lead carbonate ($2PbCO_3Pb(OH)_2$, so-called silver white), zinc oxide (ZnO, so-called zinc white), titanium oxide ($TiO_2$, so-called titanium white), strontium titanate ($SrTiO_3$, so-called titanium strontium white), and among them, titanium oxide is preferred. Inorganic particles used in the white pigment may be a single body, or may be composite particles with an oxide, an organic metal compound, or an organic compound of, for example, silicon, aluminum, zirconium, titanium, or the like.

Here, titanium oxide has a lower specific gravity than other white pigments, and has a great refraction index, and is chemically and physically stable, and therefore titanium oxide has a great obliterating power or coloring power as a pigment, and furthermore, has excellent durability against acid, alkali, and other environments. Therefore, titanium oxide is preferably used as the white pigment, and it is needless to say that, if necessary, other white pigments (not limited to the white pigments listed above) may be used.

Since the pigments exhibiting a color other than white exhibit a better coloring property as the average particle diameter decreases, in a case in which a pigment dispersion other than the pigments exhibiting a color other than white is applied, the average particle diameter of the pigment included in the pigment dispersion is preferably in a range of approximately 0.01 µm to 0.4 µm, and more preferably in a range of 0.02 µm to 0.3 µm.

In addition, the maximum particle diameter of the pigment is preferably 3 µm or less, and more preferably 1 µm or less. The particle diameter of the pigment can be adjusted through the selection of a pigment, a dispersant, and a dispersion medium, the setting of dispersion conditions and filtration conditions, and the like. In addition, in a case in which the ink composition of the present invention is prepared as a white ink composition, the average particle diameter of the pigment included in the pigment dispersion is preferably in a range of approximately 0.05 µm to 1.0 µm, and more preferably in a range of approximately 0.1 µm to 0.4 µm from the viewpoint of imparting a sufficient obliterating property. In a case in which a white pigment dispersion is used as well, the maximum particle diameter of the pigment is 3 µm or less, and preferably 1 µm or less.

(Dispersant)

In a case in which a pigment is used as the colorant, a pigment dispersant may be used as necessary when pigment particles are prepared, and examples of the pigment dispersant that can be used include activators such as higher fatty acid salts, alkyl sulfate salts, alkyl ester sulfate salts, alkyl sulfonate salts, sulfosuccinate salts, naphthalenesulfonic acid salts, alkyl phosphate salts, polyoxyalkylene alkyl ether phosphate salts, polyoxyalkylene alkyl phenyl ethers, polyoxyethylene polyoxypropylene glycol, glycerin ester, sorbitan ester, polyoxyethylene fatty acid amides, and amine oxide, block copolymers formed of two or more monomers selected from styrene, styrene derivatives, vinyl naphthalene derivatives, acrylic acid, acrylic acid derivatives, maleic acid, maleic acid derivatives, itaconic acid, itaconic acid derivatives, fumaric acid, and fumaric acid derivatives, random copolymers, and salts thereof.

In addition, in the ink composition of the present invention, it is also possible to use a self-dispersing pigment. The self-dispersing pigment mentioned in the present invention refers to a pigment that can be dispersed without a dispersant, and is particularly preferably a pigment particle having a polar group on the surface.

The pigment particle having a polar group on the surface mentioned in the present invention refers to a particle of a pigment in which the surface of the pigment particle is directly modified by a polar group or a pigment to which a polar group is bonded directly or through a joint using an organic substance having an organic pigment parent nucleus (hereinafter, referred to as a pigment derivative).

Examples of the polar group include a sulfonic acid group, a carboxylic acid group, a phosphoric acid group, a boric acid group, and a hydroxyl group, and the polar group is preferably a sulfonic acid group or a carboxylic acid group, and more preferably a sulfonic acid group.

Examples of a method for obtaining the pigment particles having a polar group on the surface include methods described in WO97/48769A, JP1998-110129A (JP-H10-110129A), JP1999-246807A (JP-H11-246807A), JP1999-57458A (JP-H11-57458A), JP1999-189739A (JP-H11-189739A), JP1999-323232A (JP-H11-323232A), and JP2000-265094A in which the surfaces of pigment particles are oxidized using an appropriate oxidant, thereby introducing a polar group called a sulfonic acid group or a salt thereof into at least a part of the pigment surface. Specifically, the pigment particles can be prepared by oxidizing carbon black using concentrated nitric acid, or, in the case of a color pigment, by oxidizing carbon black using sulfamic acid, sulfonated pyridine salt, amidosulfuric acid, or the like in sulfolane or N-methyl-2-pyrrolidone. When oxidization excessively proceeds in the reaction, and substances that have turned to be water-soluble are removed and purified, a pigment dispersion can be obtained. In addition, in a case in which a sulfonic acid group is introduced into the surface through oxidization, the acidic group may be neutralized as necessary using a basic compound.

Additional examples of a method for obtaining the pigment particles having a polar group on the surface include methods described in JP1999-49974A (JP-H11-49974A), JP2000-273383A, JP2000-303014A, and the like in which a pigment derivative is adsorbed to the surface of a pigment particle through a treatment such as milling, methods described in JP2002-179977A and JP2002-201401A in which a pigment is dissolved in a solvent together with a pigment derivative, and then is crystallized in a poor solvent, and the like, and the pigment particles having a polar group on the surface can be easily obtained using any of the above-described methods.

The polar group on the pigment surface may be in a free state or a salt state, or may have a counter salt. Examples of the counter salt include inorganic salts (lithium, sodium, potassium, magnesium, calcium, aluminum, nickel, and ammonium) and organic salts (triethyl ammonium, diethyl ammonium, pyridinium, triethanol ammonium, and the like), and the counter salt is preferably a monovalent counter salt.

The content of the colorant with respect to the total amount of the ink composition of the present invention is preferably in a range of 0.5 mass % to 10 mass %, and more preferably in a range of 0.5 mass % to 5 mass %.

(Surfactant)

A surfactant can be added to the ink composition of the present invention.

Examples of a preferably used surfactant include anionic surfactants such as dialkyl sulfosuccinate salts, alkyl naphthalene sulfonic acid salts, and fatty acid salts, nonionic surfactants such as polyoxyethylene alkyl ethers, polyoxyethylene alkyl allyl ethers, acetylene glycols, and polyoxyethylene-polyoxypropylene block copolymers, and cationic surfactants such as alkyl amine salts and quaternary ammonium salts. Particularly, the anionic surfactant and the nonionic surfactant can be preferably used.

In addition, in the present invention, it is also possible to use a polymer surfactant, and examples of the preferable polymer surfactant include the following water-soluble resins. That is, examples thereof include styrene-acrylic acid-acrylic acid alkyl ester copolymers, styrene-acrylic acid copolymers, styrene-maleic acid-acrylic acid alkyl ester copolymers, styrene-maleic acid copolymers, styrene-methacrylic acid-acrylic acid alkyl ester copolymers, styrene-methacrylic acid copolymers, styrene-maleic acid half ester copolymers, vinyl naphthalene-acrylic acid copolymers, and vinyl naphthalene-maleic acid copolymers, and the like.

In addition, in the present invention, a silicone-based surfactant including polyalkyl siloxane or a fluorine-based surfactant having an alkyl fluoride group can be preferably used.

In a case in which the surfactant is used in the ink composition of the present invention, the amount of the surfactant added is preferably in a range of 0.1 mass % to 5 mass % with respect to the solid content of the ink composition, and the amount of the surfactant added is particularly preferably set in a range of 0.5 mass % to 2 mass %.

(Sensitizing Dye)

In the present invention, it is possible to jointly use a well-known sensitizing dye. Regarding the solubility in distilled water at room temperature (25° C.), the amount of the sensitizing dye dissolved is preferably 0.5 mass % or more, more preferably 1 mass % or more, and particularly preferably 3 mass % or more. In addition, as the sensitizing dye, it is also possible to use a photopolymerization initiator in which a water-insoluble polymerization initiator is dispersed as the sensitizing dye.

Examples of the well-known sensitizing dye that can be jointly used include N-[2-hydroxy-3-(3,4-dimethyl-9-oxo-9H-thioxantene-2-yloxy)propyl]-N,N,N-trimethylaluminum chloride, benzophenone, thioxanthone, anthraquinone derivatives, 3-acylcoumarin derivatives, terphenyl, stryleketone and 3-(aroylmethylene)thiazoline, camphorquinone, eosin, rhodamine, erythrosine, denaturants obtained by dissolving the above-described sensitizing dye in water, dispersed bodies thereof, and the like. In addition, compounds represented by Formula (i) described in JP2010-24276A or compounds represented by Formula (I) described in JP1994-107718A (JP-H6-107718A) can also be preferably used.

In the ink composition according to the present invention, in addition to the respective components described above, if necessary, in accordance with the purpose of improving discharging stability, printer head or ink cartridge aptitude, storage stability, image-storing properties, and other various performance aspects, it is possible to appropriately select and use a variety of well-known additives, for example, a viscosity adjuster, a surface tension adjuster, a resistivity adjuster, a film-forming agent, a preservative agent, a dispersant, a surfactant, an ultraviolet absorber, an antioxidant, a discoloration inhibitor, an anti-soot agent, a rust inhibitor, a solid wetting agent, fine silica particles, and the like, and examples thereof include oil droplet fine particles of fluid paraffin, dioctyl phthalate, tricresyl phosphate, and silicon oil, the ultraviolet absorbers described in JP1982-74193A (JP-S57-74193A), JP1982-87988A (JP-S57-87988A), and JP1987-261476A (JP-S62-261476A), the discoloration inhibitors described in JP1982-74192A (JP-S57-74192A), JP1982-87989A (JP-S57-87989A), JP1985-72785A (JP-S60-72785A), JP1986-146591A (JP-S61-146591A), JP1989-95091A (JP-H1-95091A), and JP1991-13376A (JP-H3-13376A), the fluorescent brighteners described in JP1984-42993A (JP-S59-42993A), JP1984-52689A (JP-S59-52689A), JP1987-280069A (JP-S62-280069A), JP1986-242871A (JP-S61-242871A), JP1992-219266A (JP-H4-219266A), and the like, pH adjusters such as sulfuric acid, phosphoric acid, citric acid, sodium hydroxide, potassium hydroxide, and potassium carbonate, and the like.

<Method for Preparing Ink Composition>

There is no particular limitation regarding the method for preparing the ink composition according to the present invention, and it is possible to prepare the ink composition by stirring, mixing, and dispersing the respective components using a container drive media mill such as a ball mill, a centrifugal mill, or a planetary ball mill, a high-speed rotation mill such as a sand mill, a medium stirring mill such as a stirring tank-type mill, or a simple disperser such as a disper. The respective components are added in an arbitrary order. Preferably, the pigment, the polymer dispersant, and the organic solvent are premixed, then, are dispersed and mixed with the obtained dispersion, a resin including the specific copolymer, water, and the organic solvent. In this case, during or after the addition, the components are uniformly mixed using a simple stirrer such as a Three-One Motor, a magnetic stirrer, a disper, or a homogenizer. The components may be mixed together using a mixer such as a line mixer. In addition, to further miniaturize the dispersed particles, the respective components may be mixed using a disperser such as a bead mill or a high-pressure jet mill. In addition, depending on the kind of the dye or the polymer dispersant, it is also possible to add a resin during the premixing carried out before the dispersion of the dye.

The ink composition of the present invention preferably has a surface tension at 25° C. in a range of 40 mN/m to 200 mN/m. The surface tension is measured using an automatic surface tensiometer CBVP-Z (manufactured by Kyowa Interface Science Co., Ltd.) under a condition of 25° C. In addition, the viscosity is preferably in a range of 1 mPa·s to 40 mPa·s, and more preferably in a range of 3 mPa·s to 30 mPa·s. The viscosity of the ink composition is measured using a VISCOMETER TV-22 (manufactured by Told Sangyo Co., Ltd.) under a condition of 25° C.

<Image-Forming Method>

The image-forming method of the present invention includes applying the ink composition onto a recording medium (also referred to as "the ink applying step"), and radiating an active energy ray onto the applied ink composition (also referred to as "the radiation step"). When the above-described steps are carried out, an image is formed by the ink composition fixed on the recording medium.

(Ink Applying Step)

Hereinafter, the ink applying step in the image-forming method of the present invention will be described.

The ink applying step in the present invention is not limited as long as the ink composition is applied onto a recording medium in the step.

A method for supplying the ink composition of the present invention onto a recording medium is particularly preferably a method in which the ink composition is applied onto a recording medium using the ink jet method. That is, the ink composition of the present invention can be preferably used for ink jet recording.

In the image-forming method of the present invention, there is no particular limitation regarding the ink jet recording apparatus used in a case in which the ink jet method is applied in the ink applying step, and it is possible to arbitrarily select and use a well-known ink jet recording apparatus that is capable of achieving the intended resolution. That is, any well-known ink jet recording apparatus, including commercially available apparatuses, is capable of discharging the ink composition onto a recording medium in the image-forming method of the present invention.

Examples of the ink jet recording apparatus that can be used in the present invention include apparatuses including an ink supply system, a temperature sensor, and heating means.

The ink supply system includes, for example, an original tank storing the ink composition of the present invention, a supply pipe, an ink supply tank located immediately in front of an ink jet head, a filter, the piezo-type ink jet head, and the like. The piezo-type ink jet head can be driven so as to discharge preferably 1 pl to 100 pl, and more preferably 8 pl to 30 pl of multi-size dots at a resolution preferably in a range of 320×320 dpi (dots per inch) to 4,000×4,000 dpi, more preferably in a range of 400×400 dpi to 1,600×1,600 dpi, and still more preferably of 720×720 dpi. Meanwhile, 'dpi' mentioned in the present invention indicates the number of dots per 2.54 cm (1 inch).

In the ink applying step, it is desirable to maintain the ink composition so as to be discharged at a constant temperature, and thus the ink jet recording apparatus preferably includes means for stabilizing the temperature of the ink composition. The ink composition is maintained at a constant temperature in a pipe system from an ink tank (in a case in which an intermediate tank is included, the intermediate tank) to a nozzle injection surface and all members. That is, the section from the ink supply tank to the ink jet head can be heat-insulated and heated.

There is no particular limitation regarding the temperature control method; however, for example, it is preferable to provide a plurality of temperature sensors at individual pipe sections, thereby controlling the heating depending on the flow rate of the ink composition and the environmental temperature. The temperature sensors can be provided in the ink supply tank and in the vicinity of the ink jet head nozzle. In addition, it is preferable to thermally block or insulate the head unit to be heated so that the apparatus main body is not influenced by the external temperature. It is preferable to thermally insulate the head unit from other sections and reduce the thermal capacity of the entire heating unit to shorten the printer initiation time necessary for heating or reduce the loss of thermal energy.

It is preferable to discharge the ink composition using the above-described ink jet recording apparatus after the viscosity of the ink composition is decreased to preferably 3 mPa·s to 15 mPa·s, and more preferably 3 mPa·s to 13 mPa·s by heating the ink composition to preferably 25° C. to 80° C., and more preferably 25° C. to 50° C. Particularly, when an ink composition having a viscosity of 50 mPa·s or less at 25° C. is used as the ink composition of the present invention, the ink composition is favorably discharged, which is preferable. The use of the above-described method enables the realization of high discharging stability.

The ink composition is preferably maintained at a constant temperature while being discharged, and the appropriate control tolerance of the temperature of the ink composition is preferably ±5° C. of the set temperature, more preferably ±2° C. of the set temperature, and most preferably ±1° C. of the set temperature.

In the present invention, the recording medium is not particularly limited, and a well-known recording medium can be used as a supporter or a recording material. Examples of the recording medium include paper, paper laminated with plastic (for example, polyethylene, polypropylene, polystyrene, or the like), a metal plate (for example, aluminum, zinc, copper, or the like), a plastic film (for example, a polyvinyl chloride resin, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, or the like), paper or a plastic film laminated or deposited with the above-described metal, and the like.

Since the ink composition of the present invention has excellent adhesiveness, the ink composition can be preferably used to a non-absorbable recording medium as the recording medium, and, among the above-described recording media, a plastic base material such as polyvinyl chloride, polyethylene terephthalate, or polyethylene is preferred, a polyvinyl chloride resin base material is more preferred, and a polyvinyl chloride resin sheet or film is still more preferred.

In the present invention, the "non-absorbable recording medium" means that the recording medium does not absorb water and the water-soluble organic solvent (the amount of water and the water-soluble organic solvent absorbed is 0 $g/m^2$), or the amount of water and the water-soluble organic solvent absorbed is 1.0 $g/m^2$ or less.

(Radiation Step)

Hereinafter, the radiation step in the image-forming method of the present invention will be described.

The radiation step in the present invention is not limited as long as an active energy ray is radiated onto the ink composition applied onto the recording medium.

Examples of the active energy ray that can be used in the radiation step include an ultraviolet ray (hereinafter, also referred to as UV light), a visible light ray, an electronic beam, and the like, and it is preferable to use UV light.

The peak wavelength of the UV light is also dependent on the absorption characteristics of the sensitizing dye used as necessary, and, for example, is preferably in a range of 200 nm to 405 nm, more preferably in a range of 220 nm to 390 nm, and still more preferably in a range of 220 nm to 350 nm. In the present invention, in a case in which the sensitizing dye or the photopolymerization initiator is not jointly used, the peak wavelength is preferably in a range of 200 nm to 310 nm, and more preferably in a range of 200 nm to 280 nm.

The UV light is appropriately radiated at an exposed surface illuminance, for example, in a range of 10 $mW/cm^2$ to 2,000 $mW/cm^2$, and preferably in a range of 20 $mW/cm^2$ to 1,000 $mW/cm^2$.

As a UV light source, a mercury lamp, a gas•solid laser, or the like is mainly used, and a mercury lamp, a metal halide lamp, and a UV fluorescent lamp are all widely known. In addition, the replacement into a GaN-based semiconductor ultraviolet light-emitting device is extremely useful in industrial and environmental senses, and both an LED (UV-LED) and an LD (UV-LD) have a small size, a long service life, a high efficiency, and a low cost, and are expected as an UV light source. In the present invention, in a case in which the sensitizing dye or the photopolymerization initiator is jointly used, a metal halide lamp, a high-pressure mercury lamp, a medium-pressure mercury lamp, a low-pressure mercury lamp, and a UV-LED are preferred, and in a case in which the sensitizing dye or the photopolymerization initiator is not jointly used, a medium-pressure mercury lamp or a low-pressure mercury lamp is preferred, and a low-pressure mercury lamp is particularly preferred.

In the radiation step, the UV light is appropriately radiated onto the ink composition of the present invention applied onto the recording medium for, for example, 0.01 seconds to 120 seconds, and preferably 0.1 seconds to 90 seconds.

The radiation conditions and the basic radiation method is disclosed by JP1985-132767A (JP-S60-132767A) can also be applied in the present invention in the same manner. Specifically, a method in which light sources are provided at both sides of a head unit including an ink discharging apparatus, and the head unit and the light sources are scanned through a so-called shuttle mode or a method in which radiation is carried out using separate light sources that are not accompanied by driving is preferred. The active energy ray is radiated for a certain time span (for example, 0.01 seconds to 120 seconds and preferably 0.01 seconds to 60 seconds) after the landing and drying by heating of the ink.

(Ink Drying Step)

The image-forming method of the present invention preferably further includes drying (also referred to as "the heating and drying step") after applying the ink and before the radiation step.

In the heating and drying step, the ink composition discharged onto the recording medium is preferably fixed by evaporating (b) the water and the water-soluble organic solvent that is jointly used as necessary using heating means.

A step for drying and fixing the discharged ink composition of the present invention by applying heat (the heating and drying step) will be described.

The heating means is not limited as long as the means is capable of drying and removing at least some of (b) the water and the water-soluble organic solvent that are jointly used as necessary, and it is possible to use a heat drum, hot air, an infrared lamp, a hot oven, a heating plate, or the like.

The heating temperature is preferably 40° C. or higher, more preferably in a range of approximately 40° C. to 150° C., and still more preferably in a range of approximately 40° C. to 80° C. The drying and heating time can be appropriately set in consideration of the composition and printing speed of the ink composition being used.

The ink composition fixed by heating is, if necessary, further fixed optically by radiating an active energy ray in the radiation step. As described above, in the radiation step, it is preferable to fix the ink composition using a UV light.

[Printed Material]

A printed material of the present invention includes images formed using the ink composition of the present invention or images formed using the image-forming method of the present invention. The printed material of the present invention turns into a printed material that is excellent in terms of both the water resistance and solvent resistance of a recorded image, and is excellent in terms of the adhesiveness to a recording medium.

EXAMPLES

Hereinafter, the present invention will be specifically described using examples, but the present invention is not limited to the examples. Unless otherwise described, "parts" and "%" are by mass.

In Examples describe below, Exemplary Compounds A-1 to A-7 were used as the specific copolymer.

In addition, in Comparative Examples, Comparative polymer compound B-1 described below was used. The synthesis of B-1 will be described.

Comparative Polymer Compound

Synthesis of Polymer B-1

7.00 g of 2-pyrrolidone was added to a 500 mL nitrogen-substituted three-neck flask equipped with the stirrer, and was heated to 80° C. in a nitrogen stream. A liquid mixture of 7.0 g of 2-pyrrolidone, 10.0 g of methacrylic acid, 0.022 g of 3-mercaptopropionic acid, and 0.02 g of dimethyl 2,2'-azobis isobutyrate was added dropwise over two hours. And then, 0.013 g of dimethyl 2,2'-azobis isobutyrate was added immediately after the completion of the dropwise addition, two hours later after the completion of the dropwise addition, and four hours later after the completion of the dropwise addition respectively, and furthermore, the components were reacted at 90° C. for two hours. Next, 8.75 g of glycidyl methacrylate, 0.05 g of tetrabutyl ammonium bromide, 0.05 g of p-methoxyphenol, and 15.0 g of 2-pyrrolidone were added thereto, and were reacted for two hours at 60° C. Furthermore, 4.59 g of sodium hydrogen carbonate, 40.1 g of water, and 11.1 g of 2-pyrrolidone were added thereto, and were heated at 50° C. for two hours, thereby obtaining an aqueous solution of 20% Polymer B-1.

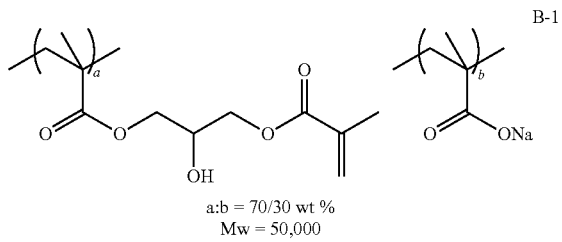

a:b = 70/30 wt %
Mw = 50,000

Examples 1 to 14 and Comparative Examples 1 and 2

(a) The specific copolymer or the comparative polymer compound, (b) the water, (c) the water-soluble organic solvent, (d) the pigment dispersion, and other raw materials were mixed and stirred using a mixer (L4R manufactured by Silverson Nippon Ltd.) at 500 rotations/minute so that the types and contents thereof became the compositions described in Table 1. Each of the mixtures obtained after stirring was loaded into a plastic disposable syringe, and was filtered using a polyvinylidene fluoride (PVDF) filter (Millex-SV manufactured by Millipore, diameter of 25 mm) having a pore diameter of 5 μm, thereby obtaining each of the ink compositions of Examples 1 to 14 and Comparative Examples 1 and 2.

The compositions of the ink compositions of Examples and Comparative Examples are described in Table 1.

TABLE 1

| | (a) Specific copolymer or comparative polymer compound | | (b) Water | Pigment dispersion | | (c) Water-soluble organic solvent | Surfactant | Ink evaluation | | | |
|---|---|---|---|---|---|---|---|---|---|---|---|
| | Type | Amount used (g) | Amount used (g) | Type | Amount used (g) | Amount used (g) | Amount used (g) | Solvent resistance | Water resistance | Latency | Bending |
| Example 1 | A-1 | 10 | 54.6 | C dispersion | 15 | 20 | 0.4 | A | A | A | A |
| Example 2 | A-2 | 10 | 54.6 | C dispersion | 15 | 20 | 0.4 | A | B | A | A |
| Example 3 | A-3 | 10 | 54.6 | C dispersion | 15 | 20 | 0.4 | A | B | A | A |
| Example 4 | A-4 | 10 | 54.6 | C dispersion | 15 | 20 | 0.4 | A | A | A | A |
| Example 5 | A-5 | 10 | 54.6 | C dispersion | 15 | 20 | 0.4 | A | A | A | A |
| Example 6 | A-6 | 10 | 54.6 | C dispersion | 15 | 20 | 0.4 | A | A | A | A |

TABLE 1-continued

|  | (a) Specific copolymer or comparative polymer compound | | (b) Water | Pigment dispersion | | (c) Water-soluble organic solvent | Surfactant | Ink evaluation | | | |
|---|---|---|---|---|---|---|---|---|---|---|---|
|  | Type | Amount used (g) | Amount used (g) | Type | Amount used (g) | Amount used (g) | Amount used (g) | Solvent resistance | Water resistance | Latency | Bending |
| Example 7 | A-7 | 10 | 54.6 | C dispersion | 15 | 20 | 0.4 | A | A | A | A |
| Example 8 | A-7 | 5 | 59.6 | C dispersion | 15 | 20 | 0.4 | A | B | A | A |
| Example 9 | A-7 | 10 | 54.6 | C dispersion | 15 | 20 | 0.4 | A | A | A | A |
| Example 10 | A-7 | 15 | 49.6 | C dispersion | 15 | 20 | 0.4 | A | A | B | A |
| Example 11 | A-7 | 20 | 44.6 | C dispersion | 15 | 20 | 0.4 | A | A | B | A |
| Example 12 | A-7 | 10 | 44.6 | M dispersion | 35 | 10 | 0.4 | B | A | A | A |
| Example 13 | A-7 | 10 | 49.6 | Y dispersion | 20 | 20 | 0.4 | A | A | A | A |
| Example 14 | A-7 | 10 | 49.6 | K dispersion | 20 | 20 | 0.4 | A | A | A | A |
| Comparative Example 1 | B-1 | 10 | 54.6 | C dispersion | 15 | 20 | 0.4 | C | C | C | A |
| Comparative Example 2 | B-1 | 10 | 51.6 | C dispersion | 15 | 20 | 0.4 | A | A | C | C |

To the ink composition of Comparative Example 2, 3 g of a photopolymerization initiator Irgacure 2959 (manufactured by BASF) was added.

In all Examples and Comparative Examples, 2-pyrrolidone (manufactured by Wako Pure Chemical Industries, Ltd.) was used as (c) the water-soluble organic solvent, and ZONYL FSN (a fluorine-based surfactant, manufactured by Sigma-Aldrich Japan K.K.) was used as the surfactant. In addition, ion exchange water was used as (b) the water.

Regarding the pigment dispersion, a magenta pigment dispersion Projet Magenta APD 1000 as a M dispersion, a cyan pigment dispersion Projet Cyan APD 1000 as a C dispersion, a black pigment dispersion Projet Black APD 1000 as a K dispersion, and a yellow pigment dispersion Projet Yellow APD 1000 as a Y dispersion, (all manufactured by Fujifilm Imaging Colorant Limited) were respectively used. In addition, the viscosities of all the prepared ink compositions were in a range of 4 mPa·s to 10 mPa·s at room temperature.

<Evaluation>

Each of the obtained ink compositions of Examples and Comparative Examples was applied to a 8 cm×8 cm square polyvinyl chloride base material (AVERY 400 GLOSS WHITE PERMANENT manufactured by Avery Dennison Corp.) using a No. 2 bar of a K hand coater manufactured by RK Print Coat Instruments Ltd. to a thickness of 12 μm. Furthermore, water was dried at 60° C. for three minutes, and then the ink composition was exposed using a low-pressure mercury lamp under a condition in which the energy reached 1000 mJ/cm$^2$, thereby obtaining a printed material including a cured film (solid image) on the polyvinyl chloride base material.

The following evaluations were carried out using the obtained printed materials. The evaluation results are described in Table 1.

<Water Resistance Evaluation>

The surface of the obtained printed material including the cured film was rubbed with a cotton swab soaked with ion exchange water, and was evaluated using the following evaluation standards. A and B are levels that do not cause any practical problems.

—Evaluation Standards—

A: There was no observable change in the image even after the image was rubbed 50 or more times.

B: The concentration of the image was decreased when the image was rubbed 10 to 49 times.

C: The concentration of the image was significantly decreased when the image was rubbed 0 to 9 times.

<Solvent Resistance Evaluation>

The surface of the obtained printed material including the cured film was rubbed with a cotton swab soaked with isopropyl alcohol, and was evaluated using the following evaluation standards. A and B are levels that do not cause any practical problems.

—Evaluation Standards—

A: There was no observable change in the image even after the image was rubbed 50 or more times.

B: The concentration of the image was decreased when the image was rubbed 10 to 49 times.

C: The concentration of the image was significantly decreased when the image was rubbed 0 to 9 times.

<Latency Evaluation>

A commercially available ink jet printer (DMP-2831 manufactured by Fujifilm Dimatix) was prepared as an ink jet recording apparatus. Each of the obtained ink compositions was loaded into the ink jet printer, and a 1 cm×1 cm solid image was printed on a polyvinyl chloride base material (AVERY 400 GLOSS WHITE PERMANENT manufactured by Avery Dennison Corp.) that had been heated to 40° C. After that, the ink jet recording was paused for one minute, and then an image was formed in the same manner.

The linearity of the left end when the second image was printed was visually evaluated, and the occurrence status of latency was evaluated.

A: The left end was linear, and discharging was favorable.

B: The linearity of the left end was slightly disturbed.

C: The left end was significantly disturbed, and a droplet ejection were significantly deteriorated after the pause of the droplet ejection.

The continuous ejection properties were evaluated using images that had been yet to be left stand for one minute. Since all the ink compositions of Examples were favorable in terms of linearity, it was found that the ink composition of the present invention is favorable in terms of the continuous ejection properties.

<Bending Evaluation>

A commercially available ink jet printer (DMP-2831 manufactured by Fujifilm Dimatix) was prepared as an ink jet recording apparatus. Each of the obtained ink compositions was loaded into the ink jet printer, and a 5 cm×5 cm 4 μm-thick solid image was printed on a polyvinyl chloride base material (AVERY 400 GLOSS WHITE PERMANENT manufactured by Avery Dennison Corp.) that had been heated to 40° C. The produced printed material was dried at 60° C. for three minutes, and then was exposed using a low-pressure mercury lamp under a condition in which the energy reached 1000 mJ/cm². The obtained image was cut, the base material was bent at the center section in the transportation direction at the time of forming the image by hands so that both divided parts of the rear surface (the surface opposite to the surface of the base material on which the image was formed) of the base material came into contact with each other, and cracks in the ink at the bent section were observed.

A: There was no occurrence of cracks even after the base material was bent ten times.

B: The cured film was cracked when the base material was bent five to less than ten times.

C: The cured film was cracked when the base material was bent less than five times.

At the evaluation standards of A and B, there is no practical problem caused.

<Discharge Recovery Property Evaluation>

The ink composition of Example 8 was discharged using the ink jet printer, and then was left to stand for one hour without any maintenance efforts. After that, the discharging was restarted, and it was confirmed that the discharging was possible without any problems, the ink was rapidly dissolved again even under conditions in which some of the ink composition remaining at nozzle tips from the previous droplet ejection (the discharging before the ink composition was left to stand) was dried, and the discharging was recovered.

As described in Table 1, it is found that, compared with the ink compositions of Comparative Examples, all the ink compositions of the respective examples including (a) the specific copolymer in the present invention suppress the occurrence of the latency, and are also excellent in terms of continuous ejection properties. In addition, it is found that the obtained image is excellent in terms of water resistance and solvent resistance. Furthermore, it was confirmed that, in the images obtained using the ink compositions of Examples, the images were not cracked even when being bent.

What is claimed is:

1. An ink composition comprising:
   (a) a graft copolymer including a repeating unit (a-1) having a partial structure represented by Formula (1) and a repeating unit (a-2) having a hydrophilic group in which a graft chain includes the repeating unit (a-1); and
   (b) water

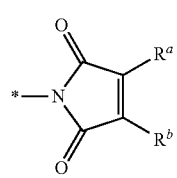

(1)

wherein; in Formula (1), each of $R^a$ and $R^b$ independently represents a hydrogen atom or an alkyl group having 1 to 4 carbon atoms, at least one of $R^a$ and $R^b$ represents an alkyl group having 1 to 4 carbon atoms, $R^a$ and $R^b$ may be bonded each other to form a 4- to 6-membered alicyclic structure, and '*' represents a bonding site.

2. The ink composition according to claim 1, wherein the repeating unit (a-1) having the partial structure represented by Formula (1) is a repeating unit represented by Formula (2),

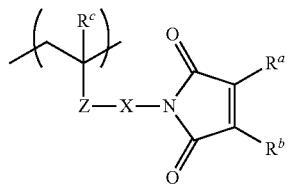

(2)

wherein; in Formula (2), each of $R^a$ and $R^b$ independently represents a hydrogen atom or an alkyl group having 1 to 4 carbon atoms, at least one of $R^a$ and $R^b$ represents an alkyl group having 1 to 4 carbon atoms, $R^a$ and $R^b$ may be bonded each other to form a 4- to 6-membered alicyclic structure, $R^c$ represents a hydrogen atom or a methyl group, Z represents a single bond, —COO—, or —CONR$^d$—, $R^d$ represents a hydrogen atom or an alkyl group having 1 to 4 carbon atoms, '**' represents a bonding site with X, and X represents a divalent organic group.

3. The ink composition according to claim 1, wherein a main chain of (a) the graft copolymer includes a repeating unit represented by Formula (3),

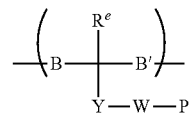

(3)

wherein; in Formula (3), Y represents a single bond, a phenylene group, —COO—, or —CONR$^d$—, $R^d$ represents a hydrogen atom or an alkyl group having 1 to 4 carbon atoms, '**' represents a bonding site with W, W represents a divalent organic group, P represents a polymer chain including a repeating unit represented by Formula (2) described below, each of B and B' independently represents a single bond, an alkylene group having 1 to 9 carbon atoms, or an arylene group having 6 to 12 carbon atoms, in addition, in a case in which B and B' are an alkylene group, one carbon atom forming the alkylene group may be substituted by —O—, —OC(=O)—, —C(=O)O—, —OC(C=O)NR$^f$—, or —NR$^g$C(=O)NR$^h$—, R$^e$ represents a hydrogen atom or an alkyl group having 1 to 4 carbon atoms, each of R$^f$, R$^g$, and R$^h$ independently represents a hydrogen atom or a linear alkyl group having 1 to 4 carbon atoms,

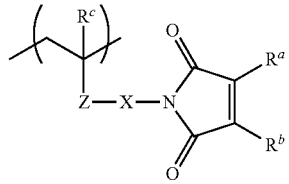

(2)

wherein; in Formula (2), each of $R^a$ and $R^b$ independently represents a hydrogen atom or an alkyl group having 1 to 4 carbon atoms, at least one of $R^a$ and $R^b$ represents an alkyl group having 1 to 4 carbon atoms, $R^a$ and $R^b$ may be bonded each other to form a 4- to 6-membered alicyclic structure, $R^c$ represents a hydrogen atom or a methyl group, Z represents a single bond, —COO—, or —CONR$^d$—, R$^d$ represents a hydrogen atom or an alkyl group having 1 to 4 carbon atoms, '**' represents a bonding site with X, and X represents a divalent organic group.

4. The ink composition according to claim 1,
wherein the repeating unit (a-2) having a hydrophilic group is a repeating unit having at least one hydrophilic group selected from the group consisting of an alcoholic hydroxyl group, an alkyl-substituted carbamoyl group, a carboxyl group, a sulfo group, and salts thereof.

5. The ink composition according to claim 1,
wherein the repeating unit (a-2) having a hydrophilic group is a repeating unit having at least one hydrophilic group selected from a carboxyl group and salts thereof.

6. The ink composition according to claim 1,
wherein (a) the graft copolymer is a copolymer of a macromonomer including the repeating unit (a-1) having a partial structure represented by Formula (1).

7. The ink composition according to claim 1,
wherein a content of the repeating unit (a-1) having a partial structure represented by Formula (1) is in a range of 20 mass % to 70 mass % of a total mass of (a) the graft copolymer, and a content of the repeating unit (a-2) having a hydrophilic group is in a range of 8 mass % to 25 mass % of the total mass of (a) the graft copolymer.

8. The ink composition according to claim 1,
wherein (a) the graft copolymer further include a repeating unit (a-3) having a hydrophobic group.

9. The ink composition according to claim 8,
wherein the repeating unit (a-3) having a hydrophobic group is a repeating unit derived from alkyl(meth)acrylate having 4 to 22 carbon atoms.

10. The ink composition according to claim 1, further comprising:
(d) a colorant.

11. The ink composition according to claim 1, which is used for ink jet recording.

12. The ink composition according to claim 1, which is used for printing on a non-permeable recording medium.

13. An image-forming method comprising:
applying the ink composition according to claim 1 onto a recording medium; and
radiating an active energy ray onto the ink composition applied to the recording medium.

14. The image-forming method according to claim 13 further comprising:
drying at least some of (b) the water included in the ink composition applied to the recording medium to remove.

15. A printed material comprising:
an image formed by the ink composition according to claim 1 on a recording medium.

16. A printed material comprising:
an image formed by the image-forming method according to claim 13 on a recording medium.

* * * * *